(12) United States Patent
Mehranfar

(10) Patent No.: US 9,373,014 B1
(45) Date of Patent: Jun. 21, 2016

(54) SYSTEMS AND METHODS FOR EVENT MONITORING USING AERIAL DRONES

(71) Applicant: Parachute Systems, Inc., Dover, DE (US)

(72) Inventor: Robert R. Mehranfar, Alamo, CA (US)

(73) Assignee: Parachute Systems, Inc., Dover, DE (US)

( * ) Notice: Subject to any disclaimer, the term of this patent is extended or adjusted under 35 U.S.C. 154(b) by 0 days.

(21) Appl. No.: 14/965,788

(22) Filed: Dec. 10, 2015

Related U.S. Application Data

(63) Continuation-in-part of application No. 14/923,089, filed on Oct. 26, 2015, which is a continuation of application No. 14/735,773, filed on Jun. 10, 2015, now Pat. No. 9,195,866.

(51) Int. Cl.
*G06K 7/01* (2006.01)
*G06K 7/10* (2006.01)

(52) U.S. Cl.
CPC ................... *G06K 7/10366* (2013.01)

(58) Field of Classification Search
None
See application file for complete search history.

(56) References Cited

U.S. PATENT DOCUMENTS

| | | | | |
|---|---|---|---|---|
| 7,336,962 | B2 * | 2/2008 | Levitan | G01S 5/06 340/573.4 |
| 2003/0210148 | A1 | 11/2003 | Imasaki et al. | |
| 2007/0285245 | A1 | 12/2007 | Djuric et al. | |
| 2009/0100575 | A1 | 4/2009 | Darnborough | |
| 2009/0153298 | A1 | 6/2009 | Xu et al. | |
| 2010/0127853 | A1 | 5/2010 | Hanson et al. | |
| 2010/0159986 | A1 | 6/2010 | Lewis et al. | |
| 2011/0063113 | A1 | 3/2011 | Hook et al. | |
| 2012/0268597 | A1 | 10/2012 | Mizuno et al. | |
| 2012/0313759 | A1 | 12/2012 | Markwitz et al. | |
| 2014/0176328 | A1 | 6/2014 | Koushik | |
| 2014/0240088 | A1 | 8/2014 | Robinette et al. | |

(Continued)

FOREIGN PATENT DOCUMENTS

WO    WO2015/107199 A1    7/2015

OTHER PUBLICATIONS

Mahammad Mubeen Masud and Benjamin D. Braaten, Design of a Zeroth Order Resonator UHF RFID Passive Tag Antenna with Capacitive Loaded Coplanar Waveguide Structures, Chapter 7, Radio Frequency Identification: From System to Applications, 2003.

(Continued)

*Primary Examiner* — Jennifer Mehmood
*Assistant Examiner* — Yong Hang Jiang

(57) ABSTRACT

A radio frequency identification (RFID) network and methods for even monitoring in a closed environment includes distributing RFID readers across the environment. Readers have unique reader identifiers and communicate with a computer system. These identifiers and reader locations are stored. The location of subjects bearing passive RFID tags is acquired by reading the unique subject identifiers off the tags and associating these RFID tags with the reader identifiers of the readers making the readings. A subject data store includes the location data of the subjects obtained by the RFID readers and electronic addresses of the subjects. An instruction set data store comprising sets, each set corresponding to one of a plurality of events, is also maintained. In accordance with the instruction set data store, in response to an event, different event messages are sent to different subjects and an aerial drone is dispatched.

30 Claims, 22 Drawing Sheets

(56) References Cited

U.S. PATENT DOCUMENTS

2014/0375454 A1 12/2014 Konrad et al.
2015/0087258 A1* 3/2015 Barnes et al. ........... H04W 4/22
　　　　　　　　　　　　　　　　　　　　　　　　　　455/404.2

OTHER PUBLICATIONS

Anonymous, Darnbro Ltd, Security Clothing, Retrieved from the Internet: http://websites.uk-pic.net/Dambro_Limited/, accessed Jun. 9, 2015.

Anonymous, High School in Fontana Placed on Lockdown During Search for Possible Weapon, May 26, 2015, Retrieved from the Internet: http://losangeles.cbslocal.com/2015/05/26/high-school-in-fontana-placed-on-lockdown-during-search-for-possible-weapon/, accessed Jun. 9, 2015.

Ben Cosman, Meet the Stun Gun Drone that Shoots First and Doesn't Ask Questions Later, Mar. 10, 2014, The Wire: News from The Atlantic, Retrieved from the Internet: http://www.thewire.com/technology/2014/03/meet-stun-gun-drone-shoots-first-and-doesnt-ask-questions-later/358994/#disqus_thread, accessed Dec. 10, 2015.

* cited by examiner

502

A radio frequency identification (RFID) network for tracking a plurality of subjects in a closed environment with a plurality of entries is provided.

The network comprises a plurality of RFID readers distributed across the environment and a response computer system.

Each respective RFID reader in a first subset of the readers is positioned at one of the entries. Each RFID reader includes a unique reader identifier and is in communication with the response computer system.

The response computer system comprises memory and one or more processors. A sensor data store, stored in the memory, includes, for each respective RFID reader, a location in the closed environment and the unique reader identifier of the RFID reader.

Instructions, stored in the memory and configured for execution by the one or more processors, when executed by the one or more processors, cause the response computer system to execute a method including receiving indication data. The indication data encompasses the ingress or egress of each respective subject in the plurality of subjects bearing a passive RFID tag through the plurality of entries, including, for each respective subject, (i) a unique subject identifier read off a passive RFID tag in the possession of the respective subject by a corresponding RFID reader from a distance between the passive RFID tag and the corresponding RFID reader of up to forty feet and (ii) the reader identifier of the corresponding RFID reader.

504

The closed environment comprises a plurality of internal zones, and each respective RFID reader in a second subset of the plurality of RFID readers is positioned at an entry of an internal zone in the plurality of internal zones.

506

The closed environment is a warehouse, a manufacturing facility, a refinery, a school, a business campus, a cruise ship, a subject transportation hub, a government facility, a military installation, a conference center, a medical campus facility, a correctional facility, or a mine.

508

The closed environment includes one or more buildings and one or more predefined open areas.

510

The passive RFID tag is in a badge carried by or held by the subject.

512
At least a subset of the subjects in the plurality of subjects are chattels (e.g., portable equipment)

514
At least a subset of the subjects in the plurality of subjects are humans or animals.

516
Maintain a visual position map based on the indication data, the visual position map comprising a respective position, on a schematic diagram of the closed environment, of each subject bearing a passive RFID tag detected by at least one of the plurality of RFID readers.

518
Display the visual position map, with a respective icon at the position on the schematic of the closed environment of each subject bearing a passive RFID tag detected by at least one reader in the plurality of RFID readers.

520
Responsive to receiving a signal from an RFID reader in the plurality of RFID readers that a subject has moved from a first position to a second position in the closed environment, update the visual position map by changing a position of the icon corresponding to the subject to reflect the second position.

522
The closed environment comprises a plurality of internal zones, and each respective RFID reader in a second subset of the plurality of RFID readers is positioned at an entry of an internal zone in the plurality of internal zones. A first internal zone in the plurality of internal zones is monitored by a zone attendant. An identity of each subject in the first internal zone is determined from the visual position map, and the identity of each subject in the first internal zone is communicated to a device associated with the zone attendant.

524

Execute an RFID reader status module 336. The RFID reader status module maintains an RFID reader status of each RFID reader in the plurality of RFID readers. The RFID reader status module also receives, on a recurring basis, a respective status signal from each respective RFID reader in the plurality of RFID readers, where the respective status signal indicates a status of the respective RFID reader. The RFID reader status module analyzes each respective status signal for the status of the corresponding RFID reader 300.

526

The RFID reader status module further transmits a status query signal to a respective RFID reader prior to obtaining a corresponding status signal, with the corresponding status signal being responsive to the status query signal. The RFID reader status module maintains an RFID reader data store for the plurality of RFID readers. The RFID reader data store comprises an RFID reader health status, on a temporal basis, for each RFID reader in the plurality of RFID readers. The RFID reader status module maintains an RFID reader corrective action data store comprising a respective RFID reader corrective action for each RFID reader health criterion in a plurality of RFID reader health criteria. The analyzing each respective status signal for the status of the corresponding RFID reader further comprises sending a corrective action signal comprising a respective RFID reader corrective action to an RFID reader 300 in the plurality of RFID readers when the RFID reader fails to satisfy an RFID health criterion in the plurality of RFID reader health criteria. This respective RFID reader corrective action is obtained from the RFID reader corrective action data store 248.

528

Maintain a subject data store, the subject data store comprising a respective record of each subject in the plurality of subjects, each respective record including (i) a history of ingress into and egress from the closed environment by the corresponding subject, (ii) an electronic address associated with the corresponding subject, and (iii) a unique subject identifier associated with the corresponding subject

530

The electronic address is a mobile phone number, social media account, or e-mail address associated with the corresponding subject.

> Receive selection instructions, the selection instructions specifying (i) a subset of the closed environment and (ii) a message for all subjects in the subset of the closed environment. The collection of subjects in the plurality of subjects that are present in the subset of the closed environment are identified by, e.g., querying the visual position map for all subjects in the subset of the closed environment. Obtain, for each respective subject in the collection of subjects, the electronic address associated with the respective subject from the subject data store. Communicate the message to the electronic address of each subject in the collection of subjects.

/— 534

> Maintain an authorized interrogator white list for a first subject in the plurality of subjects, the authorized interrogator white list including, for each respective authorized interrogator, an identity of the respective authorized interrogator and a remote device associated with the respective authorized interrogator. There is received, across a data network, a remote interrogation request from an interrogator that is outside the plurality of subjects. The interrogation request includes an identity of the interrogator and an identity of the first subject. Responsive to the interrogation request, a determination is made, using the subject data store, as to whether the interrogator is in the authorized interrogator white list for the first subject. When the interrogator is in the authorized interrogator white list for the first subject, a location in the closed environment of the first subject is obtained and communicated to the interrogator (e.g., to the remote device associated with the interrogator) that is in the authorized interrogator white list. When the interrogator is not in the authorized interrogator white list for the first subject, the location of the first subject is not communicated to the interrogator.

/— 536

Maintain an event instruction set data store, each respective event instruction set in the event instruction set data store corresponding to one event, or a combination of events, in a plurality of events.

538 — A first event instruction set in the instruction event set data store corresponds to a first event and includes (i) a first message that is to be sent to a first subset of subjects in the plurality of subjects on the basis that they are localized by the visual position map to a first portion of the closed environment, without human intervention, responsive to the first event at a time when the first event occurs, and (ii) a second message that is to be sent to a second subset of subjects in the plurality of subjects on the basis that they are localized by the visual position map to a second portion of the closed environment, without human intervention, responsive to the first event at a time when the first event occurs. In response to receiving an indication that the first event has occurred, an identity of the first and second subset of subjects is obtained from the visual position map. Further, for each respective subject in the first subset of subjects, the electronic address associated with the respective subject is obtained from the subject data store. The first message is communicated to the respective electronic address of each subject in the first subset of subjects. For each respective subject in the second subset of subjects, the electronic address associated with the respective subject from the subject data store is obtained. The second message is communicated to the mobile respective electronic address of each subject in the second subset of subjects.

540 — Transmit one of a respective GPS position or respective RFID reader location of each responder in a plurality of responders to the first subset or the second subset of subjects.

542 — A first event in the plurality of events transpires and there is displayed on the schematic diagram (i) a position of each RFID reader in at least a subset of the plurality of RFID readers and (ii) a position of the first event.

544 — A first event in the plurality of events transpires, and the instructions further cause the response computer system to, responsive to the first event, transmit instructions for formatting, for display, the visual position map, with a respective icon at the position on the schematic diagram of the closed environment of each subject bearing a passive RFID tag detected by at least one of the plurality of RFID readers and a location of each RFID reader in the plurality of readers, on a remote computing device associated with a responder to the event.

Each respective record in the subject data store further includes a class label, in a plurality of class labels, associated with the corresponding subject. A first event instruction set in the event instruction set data store corresponds to a first event and includes (i) a first communication that is to be sent to a first subset of subjects in the plurality of subjects on the basis that they are associated with a first class label in the plurality of class labels and (ii) a second communication that is to be sent to a second subset of subjects in the plurality of subjects on the basis that they are associated with a second class label in the plurality of class labels. The response computer system, in response to receiving an indication that the first event has occurred, obtains an identity of the first and second subset of subjects from the visual position map and obtains, for each respective subject in the first subset of subjects, the electronic address associated with the respective subject from the subject data store. The first communication is communicated to the electronic address of each subject in the first subset of subjects. There is obtained, for each respective subject in the second subset of subjects, the electronic address associated with the respective subject from the subject data store. The second communication is communicated to the electronic address of each subject in the second subset of subjects.

─ 550

The first class label is associated with event responders and the second class label is associated with event rescuees.

A first event instruction set in the event instruction set data store corresponds to a first event and includes a first communication that is to be sent to a first subject in the plurality of subjects on the basis that (i) the first subject is associated with a first class label in the plurality of class labels and (ii) an event has occurred. In response to receiving an indication that the first event has occurred, an identity of the first subject is obtained from the visual position map on the basis that the first subject has the first class label. For the first subject, the electronic address associated with the respective subject is obtained from the subject data store. The first communication is communicated to the electronic address of the first subject.

554

The first event is exceeding zone capacity in a first zone in the closed environment and the first communication is a warning to the first subject regarding the zone capacity in the first zone.

556

A first event instruction set in the event instruction set data store corresponds to a first event associated with a first location in the closed environment and includes a first communication. In response to receiving an indication that the first event has occurred, the first event is communicated to the system administrator.

558

The first event is exceeding zone capacity in a first zone in the closed environment and the first communication is a warning regarding exceeding zone capacity in the first zone.

560

Display the visual position map, icons at the positions on the schematic diagram of the closed environment of each subject bearing a passive RFID tag detected by an RFID reader. The map optionally further displays, on the schematic diagram, some or all of the RFID readers, and optionally further displays a location of a first event on the schematic diagram when the first event transpires. Selection instructions that specify a message for all subjects in a subset of the closed environment are received. The subset of the environment is identified by a user by selecting a corresponding portion of the displayed visual position map. The collection of subjects present in the subset of the closed environment is identified by querying the visual position map. The electronic addresses associated with these subject are obtained from the subject data store and the message is communicated to each such subject via the electronic addresses.

Display the visual position map with a respective icon at the position on the schematic diagram of the closed environment of each subject bearing a passive RFID tag detected by at least one of the plurality of RFID readers. The visual position map optionally further displays on the schematic diagram at least a subset of the RFID readers in a plurality of the RFID readers and optionally further displays a location of a first event on the schematic diagram when the first event transpires. Selection instructions are received that specify (i) a subset of the closed environment and (ii) a message for all subjects in the subset of the closed environment. The subset of the closed environment is identified by a user by selecting a corresponding portion of the displayed visual position map. A responder or caretaker associated with the subset of the closed environment is identified and the message is communicated to the responder or caretaker.

564

The first event is exceeding zone capacity in a first zone in the closed environment and the first communication is a warning to the first subject regarding the zone capacity in the first zone.

566

A first RFID reader in the plurality of RFID readers further comprises a second sensor, other than an RFID sensor and the instructions further cause the response computer system to, responsive to receiving an indication of an event in a portion of the closed environment associated with the first RFID, remotely use the second sensor to verify an occurrence of the event.

568

The second sensor is a camera, a temperature sensor, a noise-level detector or a gas monitor.

Fig. 5H

SYSTEMS AND METHODS FOR EVENT MONITORING USING AERIAL DRONES

CROSS-REFERENCE TO RELATED APPLICATIONS

This application is a continuation-in-part of U.S. patent application Ser. No. 14/923,089 filed Oct. 26, 2015, which is a continuation of U.S. Pat. No. 9,195,866, filed Jun. 10, 2015, the contents of which are hereby incorporated by reference herein in their entirety.

TECHNICAL FIELD

The present disclosure relates generally to systems and methods for tracking subjects in a closed environment, such as a school campus or an office park, using a distributed network of radio frequency identification (RFID) readers distributed across the closed environment. The systems and methods provide economical solutions for emergency response, building regulation compliance, time and attendance and other tracking applications.

BACKGROUND

Systems and methods for emergency and response and tracking of subjects in closed (defined) environments, such as warehouses, a manufacturing facilities, refineries, schools, business campuses, cruise ships, transportation hubs, government facilities, military installations, conference centers, medical facilities, correctional facilities, hotels and mines have been around in some form of another since the advent of such environments. Moreover, such systems have benefited from technologies such as global position satellite and cellular services. Nevertheless, just a brief survey of the news indicates that improvements in the field are needed.

On May 26, 2015, Fontana, Calif. deputies placed a public high school on lockdown after receiving report of two male juveniles who were seen possibly in possession of a handgun. Deputies said the two students were not found in possession of a weapon. However, they were transported to the Fontana Sheriffs Station for further investigation as a precautionary measure and the school remained in lockdown until authorities searched all areas of the school.

On Jun. 14, 2013, a Frenchtown Township factory in Monroe County Mich. went into lockdown after an employee made several threats to show up and shoot people. The suspect was found at a nearby hotel and arrested on charges of making threats and inciting a panic. Officials at the factory reported the suspect made threats to come in and shoot up the place.

On May 13, 2014, an explosion at a coal mine in Soma, Manisa, Turkey, caused an underground mine fire, which burned until May 15, 2014. In total, 301 people were killed. The mine, operated by coal producer Soma Kömür İş letmeleri A. Ş., suffered an explosion. The explosion occurred during the mine's shift change, and 787 workers were underground at the time.

As these incidents illustrate, the need for cost effective systems and methods for tracking a plurality of subjects continues unabated. While GPS tracking through smart phones or similar devices shows some promise, GPS doesn't work inside buildings, which is a problem when trying to track subjects in buildings, especially multi-story buildings or underground situations. In such situations, the ability to specify the location of subjects is not possible using GPS. This is a problem that firefighters, police and rescue personnel face every day when they enter a facility. Moreover, school shootings, such as the above identified examples, appear to be on a rise.

Thus, given the above background, what is need in the art are improved systems and methods for tracking a plurality of subjects in a closed environment.

SUMMARY

The disclosed embodiments address the need in the art for improved systems and methods for tracking a plurality of subjects in a closed environment. In the present disclosure, a radio frequency identification (RFID) network and methods thereof are provided for tracking subjects in a closed environment. The RFID readers are distributed across the environment. In essence, the RFID readers define the closed environment. In some embodiments, some or all of the RFID readers are at entry points to the closed environment.

The RFID readers can be permanent stationary readers, or mobile units for an impromptu/temporary zone establishment, for example a gathering place outside in case of a fire, or to temporarily cover the functionality of a permanently stations reader that is currently inoperable. Accordingly, in some instances, some of the RFID readers are permanently stationed while some of the RFID readers are transiently stationed. In other instances, all of the RFID readers are permanently stationed. In still other instances, all of the RFID readers are transiently stationed.

Each RFID reader has a unique reader identifier and communicates with a computer system. The computer system stores these reader identifiers and reader locations. Subjects to be tracked by the disclosed system bear passive RFID tags and enter and leave the closed environment over time. Each RFID tag includes a unique subject identifier that uniquely identifies the subject bearing the RFID tag. As subjects enter and/or exit from the closed environment, their ingress and/or egress is detected by the RFID readers at the environment entry points. An RFID reader detects such activity by reading the unique subject identifier off the RFID tags from up to forty feet. Advantageously, the disclosed system is inexpensive to manufacture and thus may be expansively deployed.

The RFID readers report their reads by passing along the subject identifiers they read to the computer system. Included in such reports is the unique reader identifier of the RFID reader so that the computer system knows the position in the closed environment where such entries or exits transpired. This entry/exit information, together with a lookup table that includes the positions of each of the RFID reader in the closed environment, informs a map comprising positions, on an environment diagram, of the subjects. Moreover, the status of the readers is maintained by receiving and analyzing status signals from the readers. A subject data store is maintained and includes the ingress/egress data and electronic addresses (e.g., telephone numbers, E-mail addresses, social network addresses) of the subjects. The computer system further maintains an instruction set data store. Each instruction set in the instruction set data store is for one of any number of events that may occur that is related to the closed environment (e.g., a fire, a security threat, overcrowding within a zone of the close environment, etc). When such an event occurs, the data regarding the whereabouts of the subjects tracked by the computer system and their contact information (e.g., electronic addresses) is leveraged to intelligently and dynamically address the event. For example, in the case of a fire in a specific zone in the closed environment, the computer system can send specific instructions to subjects in each zone of the closed environment that are exactly tailored to help bring subjects in each such zone to safety. In one example, such tailored instructions would direct subjects to the nearest exit, taking into consideration whether the exit is not obstructed by smoke or fire. Numerous other examples of alerts and the types of instructions that may be given are presented herein.

Now that a general summary of the disclosed systems and methods has been outlined, more specific embodiments of the disclosed systems and methods will be presented.

A radio frequency identification (RFID) network for monitoring events in a closed environment is provided. The network comprises a plurality of RFID readers distributed across the environment and a response computer system. Each respective RFID reader in the plurality of RFID readers includes a unique reader identifier and is in communication with the response computer system. The response computer system comprises a memory, one or more processors, and a sensor data store that is stored in the memory or that is addressable by the response computer system. The sensor data store includes, for each respective RFID reader in the plurality of RFID readers, a location in the closed environment of the respective RFID reader and the unique reader identifier of the respective RFID reader. The response computer system further comprises instructions, stored in the memory and configured for execution by the one or more processors that, when executed by the one or more processors, cause the response computer system to perform the following method.

In the method indication data is received. The indication data encompasses the detection of the proximity of a respective subject in a plurality of subjects bearing a passive RFID tag to a respective RFID reader in the plurality of readers, including (i) a unique subject identifier read off a passive RFID tag in the possession of the respective subject by the respective RFID reader and (ii) the reader identifier of the respective RFID reader. Further, a subject data store is maintained. The subject data store comprises a record for each respective subject in the plurality of subjects that includes (i) a location of the respective subject in the closed environment or an indication that the respective subject is not in the closed environment, (ii) an electronic address associated with the respective subject, and (iii) a unique subject identifier associated with the respective subject, and (iv) a class label in a plurality of class labels. Further, an event instruction set data store is maintained. Each respective event instruction set in the event instruction set data store corresponds to an event in a plurality of events. A first event instruction set in the instruction event set data store corresponds to a first event and includes a first message that is sent to a first subset of subjects in the plurality of subjects responsive to the first event. The first subset of subjects are selected from the plurality of subjects on the basis that they are (a) localized to a first portion of the closed environment or (b) associated with a first class label in the plurality of class labels corresponding to the first message, and the instructions further cause the response computer system to, in response to receiving an indication that the first event has occurred, execute an event method.

In the event method, an identity of the first subset of subjects is obtained in accordance with the first event instruction set. For each respective subject in the first subset of subjects, the electronic address associated with the respective subject is obtained from the subject data store. The first message is communicated to the respective electronic address of each subject in the first subset of subjects. Further, one or more aerial drones are dispatched to execute a surveillance protocol or a containment protocol within the closed environment.

In some embodiments, the first event instruction set further includes a second message that is to be sent to a second subset of subjects in the plurality of subjects responsive to the first event. The second subset of subjects is selected on the basis that they are (a) localized to a second portion of the closed environment different from the first portion of the closed environment, or (b) associated with a second class label in the plurality of class labels corresponding to the second message. Further, the event method also comprises (i) obtaining an identity second subset of subjects in accordance with the first event instruction set, (ii) obtaining, for each respective subject in the second subset of subjects, the electronic address associated with the respective subject from the subject data store; and (iii) communicating the second message to the respective electronic address of each subject in the second subset of subjects.

In some embodiments a drone in the one or more drones includes a video camera in electronic communication with the response computer system and the surveillance protocol comprises instructing the drone to fly to a portion in the closed environment associated with the first event and obtaining, through the drone, video surveillance data from the portion of the closed environment.

In some embodiments, the one or more aerial drones are stored at one or more storage locations in the closed environment or proximate to the closed environment. In some such embodiments, a first storage location in the one or more storage locations is a first charging pad that a first aerial drone in the one or more aerial drones lands on autonomously without human intervention and is recharged by the first charging pad autonomously without human intervention. In some embodiments, the first aerial drone comprises a rechargeable battery in electrical communication with at least two counter contacts at the bottom of the drone and the first charging pad comprises a plurality of area-wise distributed charging contacts which are insulated against each other or against neighboring primary contacts and are connectable with the at least two counter contacts when the first aerial drone lands on the first charging pad. In some embodiments, the plurality of area-wise distributed charging contacts is connected with a control unit and one or more electrical switches for wiring into a right polarity for recharging the rechargeable battery. In some embodiments, each charging contact in the plurality of area-wise distributed charging contacts is in the form of a rectangle, triangle, square or hexagonal shape. In some embodiments, the first charging pad is housed in a hanger that has a retractable entryway.

In some embodiments, a drone in the one or more drones includes a loudspeaker and a microphone in electronic communication with the response computer system and the surveillance protocol comprises instructing the drone to fly to a portion in the closed environment associated with the first event, communicating, through the loudspeaker, instructions to subjects in the plurality of subjects in accordance with the first event instruction set, and obtaining, through the microphone, audio surveillance data from the portion of the closed environment.

In some embodiments, a drone in the one or more drones includes an RFID reader in electronic communication with the response computer system and the surveillance protocol comprises instructing the drone to fly to a portion in the closed environment associated with the first event and obtaining, through the RFID reader, confirmation of an identity of each subject in the portion of the closed environment.

In some embodiments, a drone in the one or more drones includes a video camera and a debilitating device in electronic communication with the response computer system and the containment protocol comprises instructing the drone to fly to a portion in the closed environment associated with the first event, obtaining, through the video camera, confirmation of a nefarious subject activity occurring in the portion of the closed environment, receiving authorization, at the drone from the response computer system, to use the debilitating device upon confirmation of the nefarious subject activity, and using the debilitating device to counter the nefarious subject activity. In some such embodiments, the debilitating device is a stun gun and using the debilitating device to counter the nefarious subject activity comprise stunning a subject responsible for the nefarious subject activity with an electric shock. In some such embodiments, the debilitating device is a smoke bomb and using the debilitating device to counter the nefarious subject activity comprises activating the smoke bomb.

In some embodiments, a drone in the one or more drones includes a sensor in electronic communication with the response computer system and the surveillance protocol comprises instructing the drone to fly to a portion in the closed environment associated with the first event and obtaining, through the drone, sensor data from the portion of the closed environment using the sensor. In some embodiments, the sensor is temperature sensor, a noise-level detector, a gas monitor, an air flow meter, a humidity sensor, a pressure sensor, a chemical sensor, or a radiation sensor. In some such embodiments, the surveillance protocol further comprises using the sensor to map out one or more safe passage routes from the portion in the closed environment and sending the one or more safe passage routes to the response computer system for dissemination to the first subset of subjects.

In some embodiments, a drone in the one or more drones includes an 802.11 router in electronic communication with the response computer system and the surveillance protocol comprises instructing the drone to fly to a portion in the closed environment associated with the first event and providing, through the drone, 802.11 communication services to facilitate communication between subjects at the portion of the closed environment and the response computer system.

Another aspect of the present disclosure provide an RFID network for tracking a plurality of subjects in a closed environment having at least a plurality of entries is provided. The network comprises a plurality of RFID readers distributed across the environment and a response computer system. Each respective RFID reader in a first subset of the plurality of RFID readers is positioned at an entry in the plurality of entries. Each respective RFID reader in the plurality of RFID readers includes a unique reader identifier and is in communication with the response computer system. The response computer system comprises memory and one or more processors. The response computer system further comprises a sensor data store, stored in the memory. The sensor data store includes, for each respective RFID reader in the plurality of RFID readers, a location in the closed environment of the respective RFID reader and the unique reader identifier of the RFID reader.

The response computer system further comprises instructions, stored in the memory and configured for execution by the one or more processors, that, when executed by the one or more processors, cause the response computer system to receive indication data. The indication data encompasses the ingress or egress of each respective subject in the plurality of subjects bearing a passive RFID tag through entries in the plurality of entries, including, for each respective subject, (i) a unique subject identifier read off a passive RFID tag in the possession of the respective subject by a corresponding RFID reader in the plurality of readers from a distance between the passive RFID tag and the corresponding RFID reader of up to forty feet and (ii) the reader identifier of the corresponding RFID reader. The instructions further maintain a visual position map based on the indication data. The visual position map comprises a respective position, on a schematic diagram of the closed environment, of each subject bearing a passive RFID tag detected by at least one of the plurality of RFID readers.

The instructions further execute an RFID reader status module that maintains an RFID reader status of each RFID reader in the plurality of RFID readers. The RFID reader status module performs a method of receiving, on a recurring (periodic or nonperiodic) basis, a respective status signal from each respective RFID reader in the plurality of RFID readers. Such respective status signals indicate the status of the corresponding RFID readers. The method further analyzes each respective status signal for the status of the corresponding RFID reader. The method further maintains a subject data store. This subject data store comprises a respective record of each subject in the plurality of subjects. Each respective record includes (i) a history of ingress into and egress from the closed environment by the corresponding subject, (ii) an electronic address associated with the corresponding subject, and (iii) a unique subject identifier associated with the corresponding subject. The method further maintains an event instruction set data store. Each respective event instruction set in the event instruction set data store corresponds to an event in a plurality of events.

Advantageously, the disclosed system can send different messages to subjects based on their location. For instance, in some embodiments a first event instruction set in the instruction event set data store corresponds to a first event and includes (i) a first message that is to be sent to a first subset of subjects in the plurality of subjects on the basis that they are localized by the visual position map to a first portion of the closed environment, without human intervention, responsive to the first event at a time when the first event occurs, and (ii) a second message that is to be sent to a second subset of subjects in the plurality of subjects on the basis that they are localized by the visual position map to a second portion of the closed environment, without human intervention, responsive to the first event at a time when the first event occurs. Moreover, the instructions further cause the response computer system to, in response to receiving an indication that the first event has occurred, obtain an identity of the first and second subset of subjects from the visual position map and obtain, for each respective subject in the first subset of subjects, the electronic address associated with the respective subject from the subject data store. With this information, the first message is communicated to the respective electronic address of each subject in the first subset of subjects. Moreover, the computer system obtains, for each respective subject in the second subset of subjects, the electronic address associated with the respective subject from the subject data store. The response computer system communicates the second message to the mobile respective electronic address of each subject in the second subset of subjects. In some embodiments the response computer system further transmits one of a respective GPS position or respective RFID reader location of each responder in a plurality of responders to the first subset or the second subset of subjects.

In accordance with some embodiments, the response computer system displays the visual position map, with a respective icon at the position on the schematic of the closed environment of each subject bearing a passive RFID tag detected by at least one of the plurality of RFID readers. In some embodiments, this is done by segmenting the closed environment into partitions and the number of subjects in each partition is shown on the schematic. In some embodiments, the position of each RFID reader is shown on the map. In some embodiments, for security purposes, only some of the RFID readers are shown on the map. In some embodiments, responsive to a first event in the plurality of events transpiring, the response computer system displays on the schematic diagram (i) a position of each RFID reader in at least a subset of the plurality of RFID readers and (ii) a position of the first event.

In accordance with some embodiments, responsive to receiving a signal from an RFID reader in the plurality of RFID readers that a subject has moved from a first position to a second position in the closed environment, the visual position map is updated by changing a position of the icon corresponding to the subject to reflect the second position. For example, the schematic of the closed environment details a first and second room and a particular subject moves from the first room to a second room and this movement is detected by one of the RFID readers. In this example, the visual position map is updated by changing a position of the icon corresponding to the particular subject to reflect that the particular subject is now in the second room. In some embodiments where the icon indicates the number of subjects in a partition (e.g., a room), and there are already subjects in the second room, a subject count indicator displayed on the map for the second room is incremented when the particular subject moves into the second room.

In accordance with some embodiments, when an event in the plurality of events transpires, the response computer system, responsive to the event, transmits instructions for formatting, for display of the visual position map, with a respective icon at the position on the schematic diagram of the closed environment of each subject bearing a passive RFID tag detected by at least one of the plurality of RFID readers and a location of each RFID reader in the plurality of readers, on a remote computing device associated with a responder to the event. In some embodiments where the event is localized to a particular location in the closed environment, the location on the map is further included in the visual position map.

In accordance with some embodiments, the response computer system receives selection instructions that specify (i) a subset of the closed environment and (ii) a message for all subjects in the subset of the closed environment. In such embodiments, the response computer system identifies the collection of subjects in the plurality of subjects that are present in the subset of the closed environment by querying a database or other form of data structure representing the visual position map for all subjects in the subset of the closed environment. Then, the response computer system obtains, for each respective subject in the collection of subjects, the electronic address associated with the respective subject from the subject data store and communicates the message to these electronic addresses.

In accordance with some embodiments, each respective record in the subject data store further includes a class label, in a plurality of class labels, associated with the corresponding subject. Further, a first event instruction set in the event instruction set data store corresponds to a first event and includes (i) a first communication that is to be sent to a first subset of subjects in the plurality of subjects on the basis that they are associated with a first class label in the plurality of class labels and (ii) a second communication that is to be sent to a second subset of subjects in the plurality of subjects on the basis that they are associated with a second class label in the plurality of class labels. Moreover, the response computer system, in response to receiving an indication that the first event has occurred, obtains an identity of the first and second subset of subjects from the data structure supporting the visual position map, obtains, for each respective subject in the first subset of subjects, the electronic address associated with the respective subject from the subject data store and communicates the first communication to the electronic address of each subject in the first subset of subjects. Further, the response computer system obtains, for each respective subject in the second subset of subjects, the electronic address associated with the respective subject from the subject data store and communicates the second communication to the electronic address of each subject in the second subset of subjects. To illustrate, in some embodiments the first class label is associated with event responders (e.g., administrators that are responsible for the closed environment, emergency response staff, caretakers, etc.) and the second class label is associated with event rescuees (e.g., employees, students, civilians, etc.).

In accordance with some embodiments, a first event instruction set in the event instruction set data store corresponds to a first event and includes a first communication that is to be sent to a first subject in the plurality of subjects on the basis that (i) the first subject is associated with a first class label in the plurality of class labels and (ii) an event has occurred. In such embodiments, the response computer system, in response to receiving an indication that the first event has occurred, obtains an identity of the first subject from the visual position map and/or the subject data store on the basis that the first subject has the first class label and obtains, for the first subject, the electronic address associated with the respective subject from the subject data store. With this information, the response computer system communicates the first communication to the electronic address of the first subject. In some embodiments, the first event is exceeding zone capacity in a first zone in the closed environment and the first communication is a warning to the first subject regarding the zone capacity in the first zone. In some embodiments, this warning is sent to an administrator responsible for the first zone.

In accordance with some embodiments, the closed environment comprises a plurality of internal zones, and each respective RFID reader in a second subset of the plurality of RFID readers is positioned at an entry of an internal zone in the plurality of internal zones. In some such embodiments, a first internal zone in the plurality of internal zones is monitored by a zone attendant and the instructions further cause the response computer system to determine an identity of each subject in the first internal zone from the visual position map and communicate the identity of each subject in the first internal zone to a device associated with the zone attendant.

In accordance with some embodiments, an authorized interrogator white list for a first subject in the plurality of subjects is maintained. This authorized interrogator white list includes, for each respective authorized interrogator, an identity of the respective authorized interrogator and a remote device associated with the respective authorized interrogator. Further, a remote interrogation request is received, across a data network, from an interrogator that is outside the plurality of subjects. The interrogation request includes an identity of the interrogator and an identity of the first subject. Responsive to the interrogation request, the response computer system determines, using the subject data store, whether the interrogator is in the authorized interrogator white list for the first subject. When the interrogator is in the authorized interrogator white list for the first subject, a location in the closed environment of the first subject is obtained and this location in the closed environment and is communicated to the remote device associated with the interrogator that is in the authorized interrogator white list. When the interrogator is not in the authorized interrogator white list for the first subject, the location in the closed environment of the first subject is not commutated to the remote device associated with the interrogator.

In accordance with some embodiments, the closed environment is a warehouse, a manufacturing facility, a refinery, a school, a business campus, a cruise ship, a subject transportation hub, a government facility, a military installation, a conference center, a medical campus facility, a correctional facility, a hotel, or a mine. In some embodiments, the closed environment includes one or more buildings and one or more predefined open areas (e.g., an office park, college campus, etc.).

In accordance with some embodiments, the passive RFID tag is in a badge carried by or held by the subject. For instance, in some embodiments, the RFID tag is embodied in a card held (e.g., building entrance card or hotel key car) or carried by the subject. In some embodiments, the RFID tag is in a wrist band carried by the subject.

In accordance with some embodiments, the subjects are humans. In some embodiments, the subjects are animals. In some embodiments, at least some of the subjects are chattels (e.g., portable equipment). In some embodiments, some of the subjects are humans and some of the subjects are chattels.

In accordance with some embodiments, the response computer system displays the visual position map with a respective icon at the position on the schematic diagram of the closed environment of each subject bearing a passive RFID tag detected by at least one of the plurality of RFID readers. In such embodiments, the visual position map optionally further displays on the schematic diagram at least a subset of the RFID readers in a plurality of the RFID readers, and optionally further displays a location of a first event in the plurality of events on the schematic diagram when the first event transpires. Further, the response computer system receives selection instructions that specify (i) a subset of the closed environment and (ii) a message for all subjects in the subset of the closed environment. The subset of the closed environment is identified by a user by selecting a corresponding portion of the displayed visual position map. The collection of subjects in the plurality of subjects that are present in the subset of the closed environment is identified by querying the visual position map for all subjects in the subset of the closed environment. For each respective subject in the collection of subjects, the electronic address associated with the respective subject is obtained from the subject data store and the message is communicated to the electronic address of each subject in the collection of subjects.

In accordance with some embodiments, the response computer system displays the visual position map with a respective icon at the position on the schematic diagram of the closed environment of each subject bearing a passive RFID tag detected by at least one of the plurality of RFID readers. The visual position map optionally further displays on the schematic diagram at least a subset of the RFID readers in a plurality of the RFID readers, and optionally further displays a location of a first event in the plurality of events on the schematic diagram when the first event transpires. Further, the response computer system receives selection instructions, the selection instructions specifying (i) a subset of the closed environment and (ii) a message for all subjects in the subset of the closed environment. The subset of the closed environment is identified by a user by selecting a corresponding portion of the displayed visual position map. The response computer system identifies a responder or caretaker associated with the subset of the closed environment and communicates the message to the responder or caretaker.

In accordance with some embodiments, a first RFID reader in the plurality of RFID readers further comprises a second sensor, other than an RFID sensor and the response computer system, responsive to receiving an indication of an event in a portion of the closed environment associated with the first RFID, remotely uses the second sensor to verify an occurrence of the event. For instance, in some embodiments the response computer system verifies that a fire has occurred by using a smoke detector in the first RFID reader. More generally, in some embodiments, the second sensor is a camera, a temperature sensor, a noise-level detector or a gas monitor. In some embodiments, the second sensor is a proximity sensor that is used to detect a subject going by the RFID sensor. In the event that the subject is not bearing an RFID tag, this interaction event will be communicated to the response computer system. This is useful in situations such as a vehicle passing through the main entry of a closed environment that is detected as having passed through, but no valid RFID tag is read. In this case the interaction event (the event of the subject being within reading distance of an RFID reader without bearing a suitable RFID tag) can be reported to the central station along with a license plate. In other examples, human subjects who pass through an entry/exit point but are not in possession of a valid RFID tag are reported to the response computer system because of the addition of the proximity sensor. In some embodiments, the proximity detector is used to detect subjects independently of the RFID sensor.

In accordance with some embodiments, the RFID reader status module transmits a status query signal to a respective RFID reader prior to obtaining a corresponding status signal. This corresponding status signal is responsive to the status query signal. Further, the RFID reader status module maintains an RFID reader data store for the plurality of RFID readers. The RFID reader data store comprises an RFID reader health status, on a temporal basis, for each RFID reader in the plurality of RFID readers. Further, the RFID reader status module maintains an RFID reader corrective action data store comprising a respective RFID reader corrective action for each RFID reader health criterion in a plurality of RFID reader health criteria. In such embodiments, the analyzing each respective status signal for the status of the corresponding RFID reader further comprises sending a corrective action signal comprising a respective RFID reader corrective action to an RFID reader in the plurality of RFID readers when the RFID reader fails to satisfy an RFID health criterion in the plurality of RFID reader health criteria. The respective RFID reader corrective action is obtained from the RFID reader corrective action data store.

BRIEF DESCRIPTION OF THE DRAWINGS

FIGS. 5A, 5B, 5C, 5D, 5E, 5F, 5G, and 5H collectively provide a flow chart of processes and features of a radio frequency identification (RFID) network for keeping track of a plurality of subjects in a closed environment in accordance with an embodiment of the present disclosure.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
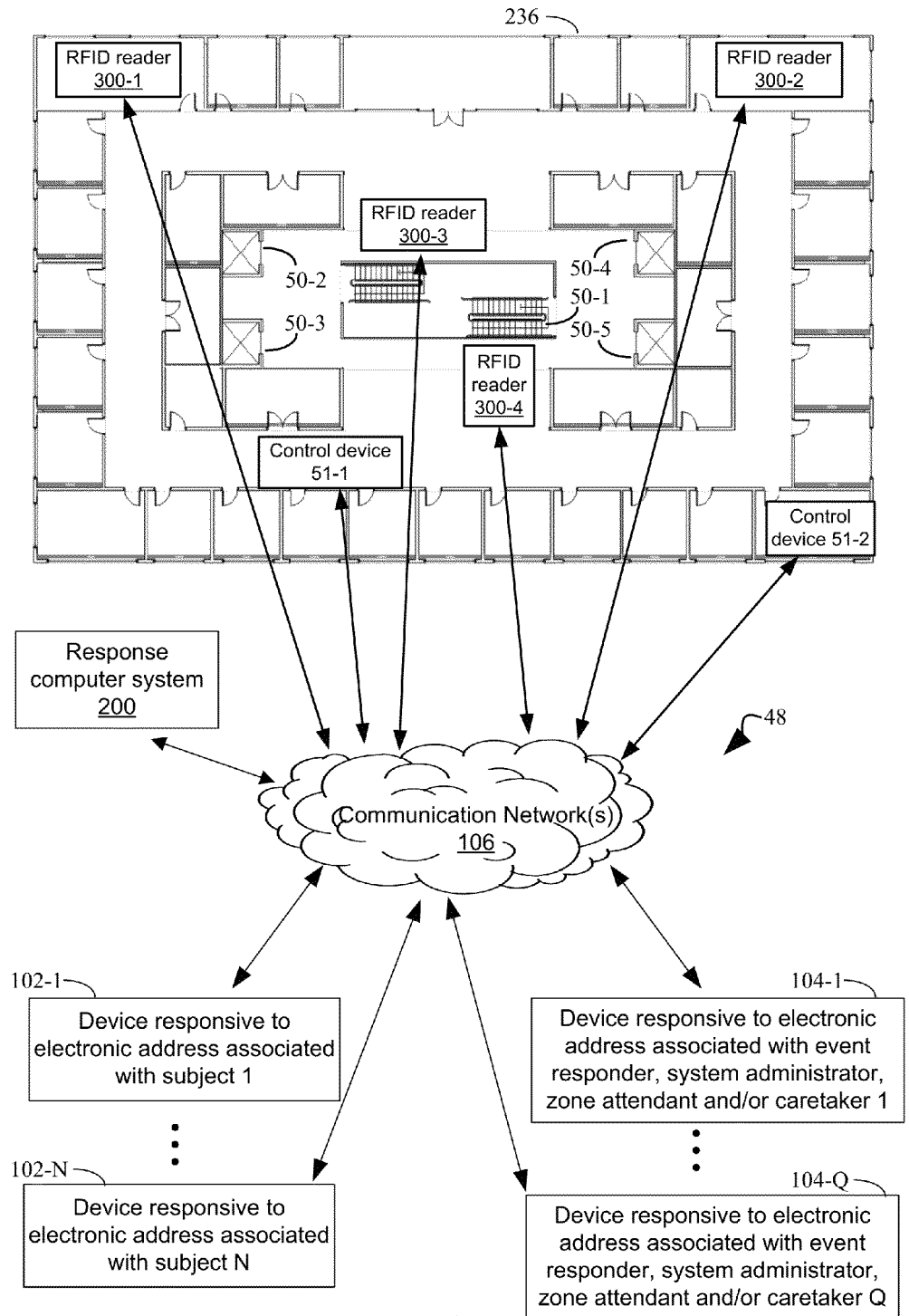
FIG. 1 illustrates a system topology in accordance with the present disclosure that includes a response computer system, a plurality of RFID readers distributed across a closed environment, devices associated with subjects that are being tracked, and devices that are associated with event responders.

A detailed description of a system 48 for tracking a plurality of subjects in a closed environment 236 in accordance with the present disclosure is described in conjunction with FIGS. 1 through 4B. As such, FIGS. 1 through 4B collectively illustrate the topology of the system in accordance with the present disclosure. In the topology, there are a plurality of RFID readers 300 distributed across the closed environment 236 (FIGS. 1 and 3), a response computer system 200 (FIGS. 1 and 2), devices 102 responsive to electronic addresses associated with subjects to be tracked (FIGS. 1 and 3), devices 104 responsive to the electronic addresses associated with event responders, system administrators, zone attendant and/or caretakers (FIGS. 1 and 4), and optional control devices 51 (e.g., emergency lights, oxygen valves, water sprinklers, door locks) that are controlled by response computer system 200 when events occur (FIG. 1). In some embodiments, the closed environment 236 includes a plurality of entries. In some embodiments, the closed environment 236 includes only a single entry. In the case of the closed environment 236 illustrated in FIG. 1, the entries include an escalator 50-1 and elevator shafts 50-2 through 50-5. In some embodiments, an RFID reader is in a badge, a wrist band, a dosimeter, or a plastic card that can fit into a purse or wallet.

Of course, other topologies of system 48 are possible, for instance, response computer system 200 can in fact constitute several computers that are linked together in a network or be a virtual machine in a cloud computing context. Further, some devices 102 and some devices 104 may be within the closed environment 236 while others are not in accordance with situations in which some subjects tracked by system 48 and some responders are in the closed environment at a given time while others are not. However, for purposes of clarity solely to show some of the components of a system topology in accordance with the present disclosure, devices 102 and 104 are shown external to the closed environment. However, in practice, as event respondents and subjects being tracked enter the closed environment, devices 102/104 associated with such event responders and subjects will necessarily likewise enter the closed environment. Moreover, in some embodiments, the response computer system 200 is depicted in the closed environment. As such, the exemplary topology shown in FIG. 1 merely serves to describe the features of an embodiment of the present disclosure in a manner that will be readily understood to one of skill in the art.

Advantageously, because of the minimalistic specifications imposed on the disclosed RFID readers 300, they can be produced cheaply and placed in the closed environment 236 at strategic locations, such as proximate to the entrances 50 of every building in the closed environment. Then, as subjects bearing RFID tags pass by such RFID readers, the RFID readers 300 report such encounters to the response computer system 200.

In some embodiments, an RFID reader senses the proximity of an RFID tag but does not ascertain whether the subject bearing the RFID tag is leaving or entering the closed premises. In some such embodiments, a determination as to whether a subject is leaving or entering the closed environment is done on a logical basis. For instance, if the response computer system 200 presently has a subject listed as within the closed environment and an RFID reader near an entry 50 reports an interaction (read) with the subject, then the response computer system 200 will conclude that the subject has left the closed environment. In some embodiments, this departure is confirmed by taking a GPS read of the coordinates of the device 102 associated with the subject and confirming that these coordinates do not fall within the closed environment. In contrast, if the response computer system 200 presently has a subject listed outside the closed environment and an RFID reader 300 near an entry 50 reports an interaction (read) with the subject (e.g., with the RFID tag associated with the subject), then the response computer system 200 will conclude that the subject has entered the closed environment. In some embodiments, this arrival is confirmed by one or more further RFID reads from RFID readers 300 within the closed environment that indicate that the subject has entered specific zones (e.g., rooms, buildings) within the closed environment.

In some embodiments, the RFID reader 300 includes two directional antennae pointing in opposite directions in order to provide closed environment ingress/egress information. For instance, if a read by antenna A and then antenna B of the RFID reader 300 is made of the subject, the subject is deemed to be entering the closed environment (or a zone thereof). Further, if a read by antenna B and then antenna A of the RFID reader 300 is made of the subject, the subject is deemed to be exiting the closed environment (or a zone thereof). In some embodiments, if a read by only one of the two antennas of an RFID reader 300 are made, then the zone of the subject is not changed on the basis that the subject merely approached the RFID reader but did not actually enter or leave the closed environment or a zone thereof. In some embodiments, sequential reads by the RFID reader 300 (e.g., antenna A and then antenna B) are required and the call made by these sequential reads must be consistent with the current location status of the subject in the response computer system 200 in order to change the status of the subject. For instance, in some embodiments, if a read by antenna A and then antenna B of the RFID reader 300 are made of the subject, the subject is deemed to be entering the closed environment, provided that at the time this call was made, the response computer system 200 had the subject recorded as not being within the closed environment. If the subject was in fact already in the closed environment, an error is flagged and possibly secondary sensors, such as a video camera or proximity sensor are consulted and/or the status of the RFID reader is queried to determine why the RFID reader 300 made an ingress/egress reading for a subject that is inconsistent with location data stored by the response computer system 200 for the subject.

By tracking the ingress/egress history of each subject, the response computer system 200 can ascertain when subjects enter the closed environment, which zone (e.g., building, building floor, etc.) in the closed environment they are in and when subjects exit the closed environment. The information from the RFID readers is communicated wirelessly, or via wire, to the response computer system 200 and the response computer system 200 graphically represents the data in the form of a visual position map. In this way, knowledge is obtained as to where everybody is inside the closed environment. Based on this location information for the subjects, if there is an emergency or other form of significant event, an event instruction set data store of the response computer system 200 can specify what the emergency is on a control panel. In some embodiments, the control panel is transmitted to the electronic address associated with each subject in the closed environment. In some embodiments, the control panel is transmitted to event responders. In some embodiments, the control panel is displayed on a console associated with the response computer system 200 for viewing by a system administrator.

Moreover, advantageously, the instructions for response to an event can be customized based on the nature of the event and the location of each subject within the closed environment (e.g., absolute location of each subject and/or the location of the subject relative to the event). So, for example, if there's a fire at location A in the closed environment, the message sent to a subject in a first zone in the closed environment can be different then the message sent to a subject in a second zone in the closed environment. To illustrate, the message sent to subjects in the first zone may be "Don't come into the zone second zone" while the message sent to subjects in the second zone may be "Go this way because the fire is over here. Don't start running towards this exit, go this way." Thus, the disclosed system advantageously provide customized event instructions, down to the level of individualized instructions for each subject in the closed environment when warranted, based on the current real time location of each subject in the closed environment. In some embodiments, such messages are further customized by subject attributes, such as whether the subjects are managers, caretakers, disabled, and the like.

As referenced above, the subject location information collected by the response computer system 200 from the RFID readers is available to event responders associated with devices 104. Such information includes the positions of subjects in the closed environment 236, the total number of subjects in the closed environment, the identities of the subjects in the closed environment, and the role of each subject in the closed environment (teacher, student, patient, armed guard, plant worker, plant manager, hotel manager, miner, etc.).

As referenced above, the response computer system 200 serves as a central place from which individual messages can be sent to select people, or groups of people, within the closed environment. In one such example, emergency personal responding to a robbery taking place in the closed environment or in the vicinity of the closed environment may query for an armed guard in the closed environment using the response computer system and, if such an armed guard is identified, use the response computer system 200 to send a message to the armed guard but not to anybody else in the closed environment. Accordingly, the response computer system 200 can be used to send messages manually when warranted. Moreover, in some instances and responsive to an event or a set of events, predetermined instruction sets can be used to notify subjects, based on event type(s) (e.g., emergency type), of the event by sending messages to the subjects. In some embodiments, the composition of these messages is different for each of the different locations across the closed environment, and even outside the closed environment. In some embodiments, the composition of these messages is further differentiated based on subject role. For example, in the case where the closed environment is a school, the response computer system may send teachers in the school additional instructions, in accordance with an event instruction set, in the form of additional reminders such as "check the classroom to make sure there's nobody under a desk." In some such embodiments, the children in the teacher's classroom are given no instructions directly by the response computer system (e.g., when the children are too young to comprehend such instructions from an electronic device and/or the school prohibits the students from possessing devices 102), and all instructions are given to the teacher by the response computer system with the expectation that the students will follow the teacher's instructions.

In some embodiments, the response computer system 200 is used to send an aerial drone to a site of the event in response to the event.

In some embodiments, an aerial drone (also interchangeably referred to as "unmanned aerial vehicles" (UAV), "remotely piloted aircraft" (RPA), and "drone devices") are robotic aircraft that do not have human pilots aboard. In some embodiments, aerial drones execute control commands that include or correspond to instructions and parameters for a flight pattern (e.g., flight line/path, speed, altitude, etc.). In some embodiments, aerial drones are autonomous and execute pre-programmed flight patterns. Additionally and/or alternatively, the aerial drone may be controlled in real-time by a user (e.g., via response computer system 200) through detected user inputs or generated controls commands. Control commands may be received by the aerial drones from mounted devices (e.g., remote computer system 200), or directly from one or more remote devices (e.g., devices 104). In some embodiments, aerial drones include one or more processors and memory storing instructions (e.g., received control commands, pre-programmed flight patterns, flight instructions, etc.) for execution by the one or more processors. In some embodiments, the aerial drones are powered by one or more electric motors. In some embodiments, the aerial drones are powered by one or more motors that run on fossil fuel. In some embodiments, the aerial drones are powered by one or more motors that run on fossil fuel and one or more electric motors.

In some embodiments, one or more storage locations within the closed environment and/or one or more storage locations proximate (e.g., within 100 feet, within 100 yards, within 500 yards) to the closed environment are used to store one or more aerial drones that are in electronic communication with the response computer system 200. For instance, in some embodiments, the one or more aerial drones are stored on a charging pad of the kind disclosed in PCT Application No. PCT/WP2015/050901 entitled "Charging Apparatus and Method for Electrically Charging Energy Storage Devices," to Skysense, Inc. published as WO 2015/107199 A1, which is hereby incorporated by reference. Accordingly, advantageously, in some embodiments the disclosed aerial drone is charged by simply landing on the charging pad.

In some embodiments the aerial drone has a rechargeable energy storage device such as a rechargeable battery in electrical communication with at least two counter contacts at the bottom of the drone. In some embodiments the aerial drone has a rechargeable energy storage device such as a rechargeable battery in electrical communication with four counter contacts at the bottom of the drone. In such embodiments, the charging pad comprises a plurality of area-wise distributed charging contacts which are insulated against each other or against neighboring charging contacts and are connectable with the at least two counter contacts when the aerial drone lands on the pad. The charging contacts are connected with a control unit and electrical switches for wiring into a right polarity for the rechargeable energy storage device charging process. In some such embodiments, the charging contacts are in the form of a rectangle, triangle, square or hexagonal shape. Accordingly, in some such embodiments, the one or more aerial drones are recharged while at these one or more storage locations.

In some embodiments, the one or more aerial drones are charged and stored in hangers while at the one or more storage locations. For instance, in some embodiments, the one or more aerial drones are stored on a charging pad within a hanger that has a retractable entryway of the kind disclosed in PCT Application No. PCT/WP2015/050901 entitled "Charging Apparatus and Method for Electrically Charging Energy Storage Devices," to Skysense, Inc., published as WO 2015/107199 A1, which is hereby incorporated by reference.

Using the above disclosed charging stations, the present disclosure encompasses embodiments in which all aspects of aerial drone maintenance and recharging are fully automated in order to provide a single aerial drone or a fleet of aerial drones for emergency response or for surveillance of the closed environment.

In some embodiments the response computer system 200 dispatches an aerial drone in response to an event to the identified location of the event within the closed environment. In some such embodiments the aerial drone comprises a camera and communicates imagery from the location of the event back to the response computer system 200. In some embodiments this imagery is forwarded to event responders. In some embodiments this imagery is opened as an additional panel alongside the visual position map.

In some embodiments the response computer system 200 dispatches an aerial drone in response to an event to the identified location of the event within the closed environment. In some such embodiments the aerial drone comprises a loudspeaker and a microphone and communicates instructions to the subjects or event responders present at the event location. For instance, the aerial drone may broadcast updates on rescue efforts or specific instructions on how to address the event.

In some embodiments the response computer system 200 dispatches an aerial drone in response to an event to the identified location of the event within the closed environment. In some such embodiments the aerial drone comprise an RFID reader 300 in wireless electronic communication with the response computer system 200 to determine an identity of each of the subjects bearing RFID tags in one more parts of the closed environment. In some such embodiments the RFID reader on the drone acts to supplement the network of stationary RFID readers. For instance, such aerial drones can be sent to portions of the closed environment that lack an RFIC reader or in which the RFID reader is not working in order to determine which subjects are in such portions of the closed environment. In some such embodiments, the aerial drones are manually dispatched for this purpose.

In some embodiments the one or more aerial drones each include an RFID tag so that their positions are picked up by the RFID readers 300 in the closed environment. Moreover, in some embodiments, the RFID readers 300 communicate the position of the one or more aerial drones to the computer system 200 and the positions of the one or more aerial drones are reported on the visual position map.

In some embodiments the one or more aerial drones each include a GPS functionality that is used to communicate the position of the one or more aerial drones to the computer system 200 (in instances where the drones are outdoors). In some such embodiments, the positions of the one or more aerial drones are reported on the visual position map.

In some embodiments, the aerial drone looks for a nefarious subject at the event location using live video from a camera on the aerial drone. In some embodiments, the aerial drone sends the live video to the response computer 200 and/or to a remote computing device associated with a responder asking for verification as to whether to detain the subject. Upon receiving an election to detain the subject from a user of the response computer 200, the aerial drone drops into fully autonomous mode where it detains the subject until event responders arrive. In some such embodiments, the aerial drone has the ability to stun the subject with a bolt of high voltage electricity (e.g. 80,000 volts) to render them incapacitated. In some such embodiments, the aerial drone has the ability to act in a kamikaze manner and crash into the nefarious subject. As such, the response computer system 200, working with event responders or the response computer system 200 administrator, is able to chase and detain one or more suspects remotely.

In some embodiments, the aerial drone looks for nefarious subjects at the event location using live video from a camera on the aerial drone. In some such embodiments, the aerial drone sends the live video to the response computer 200 and/or to a remote computing device associated with a responder asking for verification as to whether to proceed with a containment protocol. What is sought is a scenario in which the location of a nefarious subject has been identified and other subjects are not in the vicinity. Upon receiving instructions to proceed with the containment protocol, the aerial drone drops into fully autonomous mode where it drops a smoke bomb in the location of the nefarious subject.

In some embodiments, the response computer system 200 dispatches one or more aerial drones to execute a surveillance protocol, a containment protocol, and/or a rescue protocol within the closed environment. For instance, in some embodiments the response computer system 200 directs one or more drones to execute a rescue protocol. One example of a rescue protocol is dispatching an aerial drone, responsive to an event, to the identified location of the event within the closed environment. Another example of a rescue protocol is having the aerial drone serve as a guide to first responders. To illustrate, in response to an event (e.g., explosion, fire, etc.) one or more drones are automatically dispatched to one or more entrances of the closed environment to await the arrival of rescue personnel or other first responders. In some embodiments, such aerial drones are equipped with sensors to detect when such first responders arrive. Such sensors are application specific, and can include by way of example, a video camera in electronic communication with response computer system 200, an RFID reader in electronic communication with response computer system 200 to sense RFID tags worn by the first responders, and/or a microphone that accepts verbal commands from first responders. In some embodiments, such aerial drones are not equipped with sensors specific to detection of when such first responders arrive but rather an operator associated with response computer system 200 is notified when such first responders have arrived and notifies the one or more aerial drones to proceed to the location of the event once the first responders have arrived. In such embodiments, rescue personnel or other first responders will follow the low flying drone to the location of the event. Advantageously, in some embodiments, an aerial drone is sent to each of a plurality of closed environment entrances to await first responder in situations where it is not known which entrance first responders will arrive at first. In some embodiments, the network of one or more RFID readers is used to alert response computer system 200 when a first responder has arrived, in response to an event, and then one or more aerial drone are summoned to the arrival location of the first responders identified by the RFID readers in order to use the drones to guide the first responders to the site of the event.

In some embodiments, the aerial drones navigate within the closed environment (e.g. to the site of the event) autonomously using, for instance, the combination of (i) signals sent to the aerial drone by the network of RFID readers or other stationary emitters in the closed environment whose locations are known, (ii) a schematic diagram of the closed environment, and (iii) a reported location of the event. For instance, in such embodiments, the aerial drones can triangulate its coordinates on an ongoing basis in the closed environment using the signals sent from known locations in the closed environment (RFID readers, stationary 802.11 routers, cell phone base towers, etc.) and use this as a basis to guide the first responders to the event. In embodiments where the closed environment is outdoors or otherwise has a reliable GPS signal, the aerial drone can use the GPS signal to navigate to desired locations in the closed environment.

In some embodiments, each of the one or more aerial drones has an RFID tag and the network of one or more RFID readers is used to pinpoint the location of the aerial drones within the closed environment. In some such embodiments, the response computer system 200 uses this location information to direct the aerial drones to desired locations within the closed environment. In some embodiments, the aerial drones include one or more gyroscopes and or accelerometers and data from these instruments is communicated to the response computer system 200 for the purpose of pinpointing not only the location of the drones but also to determine their velocity. In some embodiments, data from both the network of RFID readers and the gyroscope/accelerometer input is used by the response computer system 200 to determine the locations of the one or more aerial drones and thus provide navigation instructions to the drones.

In some embodiments, the rescue protocol comprises dispatching a first aerial drone to the event in order to provide assistance at the first event while a second aerial drone is dispatched to the entrance of the closed environment to serve as a "follow me" guide to first response.

In some embodiments, the rescue protocol comprises dispatching one or more first aerial drones to positions in an exit route from the closed environment. Upon arrival at such positions by one or subjects in the plurality of subjects, the one or more drones guide the one or more subjects along the exit route. In this case, subjects in danger can follow the drones to get out of the dangerous situations. In some embodiments, such drones are equipped with speakers (or loudspeakers) to provide verbal instructions as well. In some embodiments, such drones are equipped with video cameras in electronic communication with the response computer system to provide an update on exis progress. In some embodiments, such drones are equipped with lights in order to light up the exit path.

In some embodiments the response computer system 200 dispatches an aerial drone in response to an event to the identified location of the event within the closed environment. In some such embodiments the aerial drone comprises one or more sensors such as a temperature sensor, noise-level detector, gas monitor, air flow meter, humidity sensor, pressure sensor, chemical sensor (e.g., smoke sensor, carbon monoxide sensor) and/or radiation sensor and communicates data from the one or more sensors to the response computer 200 and/or to a remote computing device associated with a responder. In some embodiments, the sensor is a smoke detector and the aerial drone is used to detect the location of smoke. In some such embodiments, the aerial drone uses the one or more sensors to map out a safe passage routes out of the closed environment and to communicate these passage routes to subjects, event responders and/or the response computer system 200. For instance, consider the case of a mine with several shafts and escape routes. In such embodiments, the aerial drone is used to traverse each possible escape route to determine whether it is smoke free. In some such embodiments, the aerial drone transmits an aerial view of each potential escape route for confirmation by an event responder at a remote location.

In some embodiments, the sensor is a radiation sensor and the aerial drone is used to detect the location of radiation. In some such embodiments, the aerial drone is used to map out a safe passages route out of the closed environment and to communicate these passage routes to subjects, event responders and/or the response computer system 200. For instance, consider the case of a nuclear reactor with several shafts and escape routes. In such embodiments, the aerial drone is used to traverse each possible escape route to determine whether it is radiation free. In such embodiments, the aerial drone transmits an aerial view of each potential escape route for confirmation by an event responder at a remote location.

In some embodiments the response computer system 200 dispatches an aerial drone in response to an event to the identified location of the event within the closed environment. In some such embodiments the aerial drone comprises a wireless 802.11 router to enable wireless communication between the devices associated with subjects in the closed environment and the response computer system 200. This is useful instances where there has been a power outage and/or the cellular signals in the closed environment are impaired.

What has been described is just one level of automation made possible by the response computer system 200, where the response computer executes a predetermined set of instructions in accordance with an event instruction set, responsive to detection of a single event. However, in some embodiments, multi-layered, multi-factorial instructions sets are implemented responsive to the concurrent occurrence of one or more events, two or more events, or three or more events. Such multi-factorial instruction sets can address scenarios in which there is, for example, a fire in one location, an explosion in a second location, and a shooter in a third location in the closed environment. In such a scenario, the response computer system 200 determines the appropriate response for each subject in the closed environment on an individual or groupwise basis as well as appropriate messages, information and directions for response personnel.

In a further level of automation, in some embodiments, the system 48 is installed with optional control devices 51 that are controlled by the instructions sets of the response computer system 200 when events occur and further, in some embodiments the RFID sensors 300 include additional sensors for noise, chemicals, light, or other forms of stimuli. Such topologies allow for multifaceted response to events.

In one example, when a gunshot is heard, the instructions sets of the response computer system proceed to automatically execute, without the need for human intervention, an instruction set that calls for locking a door (using a regulated control device 51), generating a 911 emergency call, and sending a text message to subjects in the closed environment detailing what action to take responsive to the gunshot (e.g., take cover, hide, escape). Furthermore, in the case of a school, information is sent to the electronic address of the teachers so that the teachers can see immediately who is missing from their class and/or the location of each student in their class. Moreover, parents of such students can use the response computer system, based on their authentication and authority level, to determine the location of their children. For instance, if a child left the school at 11 A.M. on a given Tuesday, such information is reported to the parent upon interrogation of the response computer system 200. In some embodiments, the parents are able to set up alerts within the computer system 200 so that they are notified whenever their children arrive at the closed environment or leave the closed environment. In some embodiments, caretakers that are on the white list of a given subject are able to set up alerts within the computer system 200 so that they are notified whenever their subject arrives at the closed environment or leave the closed environment.

In another example, when a gunshot is heard, the instructions sets of the response computer system proceed to automatically execute, without the need for human intervention, an instruction set that calls for dispatching an aerial drone to the location where the gunshot occurred, generating a 911 emergency call, and sending a text message to subjects in the closed environment detailing what action to take responsive to the gunshot (e.g., take cover, hide, escape). In some embodiments, the aerial drone captures footage of the location in the closed environment and transmits it to the response computer system 200 for remote determination of the status of the event. In some embodiments, as discussed above, the aerial drone executes a containment strategy such as buzzing a nefarious subject at the event location, dropping a smoke bomb at the event location, and/or zapping a nefarious subject at the event location with a high voltage.

Thus, in addition to handling emergency response or other forms of events, the disclosed systems can handle functions such as roll call, determining if there are subjects missing from the closed environment, traditional time and attendance, closed environment load balancing, and containment of nefarious subjects.

An illustration of close environment load balancing is exhibited by an example situation in which a closed environment has two functionally equivalent cafeterias and the response computer system 200 determines that there are substantially more subjects at one cafeteria than at the other cafeteria. In this illustration, the response computer system 200 can advise subjects as they approach the overcrowded cafeteria, or the manager of the overcrowded cafeteria, of the current availability of the second less crowded cafeteria.

Another example of services the disclosed system provides in some embodiments is in the case of room capacity or, more generally, zone capacity. If the number of subjects in a zone in the closed environment (e.g., a room) goes above capacity, an alert is sent that says the capacity of the zone is exceeded. The recipient of this alert is application dependent. In some applications, the alert is sent to other subjects that are in the vicinity of the zone and thus are likely about to enter the overcrowded zone. In such an application, an example alert might say "go to the overflow room." In other applications, the alert goes to the safety officer in charge of the zone, so that the safety officer may ensure that enough subjects leave the zone to bring the zone back into capacity compliance.

In some embodiments, the RFID information obtained by the RFID readers 300 is supplemented with GPS information when such information is obtainable. For instance, in some embodiments when subjects leave the closed environment, their associated devices 102 automatically send GPS information to the response computer system 200 on a recurring basis so that the response computer system 200 can track the subjects outside of the closed environment.

The disclosed systems are highly advantageous from the perspective of emergency responders as well. When first responders show up at a closed environment, such as a school or a factory, where there has been an incident (event), they typically have insufficient information as to the location of subjects within the closed environment in conventional situations. The disclosed systems address such shortcomings by providing an application for devices 104 that will provide not only a schematic of where things are and where the subjects are but, in some embodiments, will also provide information on who these subjects are (e.g., their identities), and/or what roles the subjects play (e.g., students versus teachers, patients versus medical staff, any disabilities the subject have, etc.). In one example, the information provided to the devices 104 of the first responders details how there is a fire in warehouse building three, that there are twelve subject in that warehouse and the identity of each of the subjects in the building. As such, in some embodiments, the first-responders are not only given electronic maps showing the real time location of subjects within the closed environment, they actually receive a level of information that is typically not available before entering into a closed environment. In this way, the disclosed system is able to give first responders intelligence to enable them to execute whatever strategy makes the most sense responsive to a given event. In some embodiments, one or more aerial drones dispatched by the response computer system 200 provide these first responders with live aerial footage of locations of interest within the closed environment.

Moreover, in some embodiments, the disclosed systems provide reverse communication. That is, the subjects within the closed environment are informed of the proximity and/or location of first responders. In this way, the subjects, particularly if they are trapped or disabled, can be updated on the status of efforts to save them in real time. Such information advantageously reduces panic among the trapped or disabled subjects within the closed environment.

The disclosed systems are further advantageous because parents or other people that have a caretaker relationship with subjects in the closed environment can use the disclosed systems to determine whether their subjects are still in the closed environment or have already gotten out safely. This prevents a lot of confusion and problems in emergencies because such caretakers are less likely to show up at the closed environment and interfere with rescue operations because they already know that their subjects have gotten out of the closed environment safely.

Figure 2:
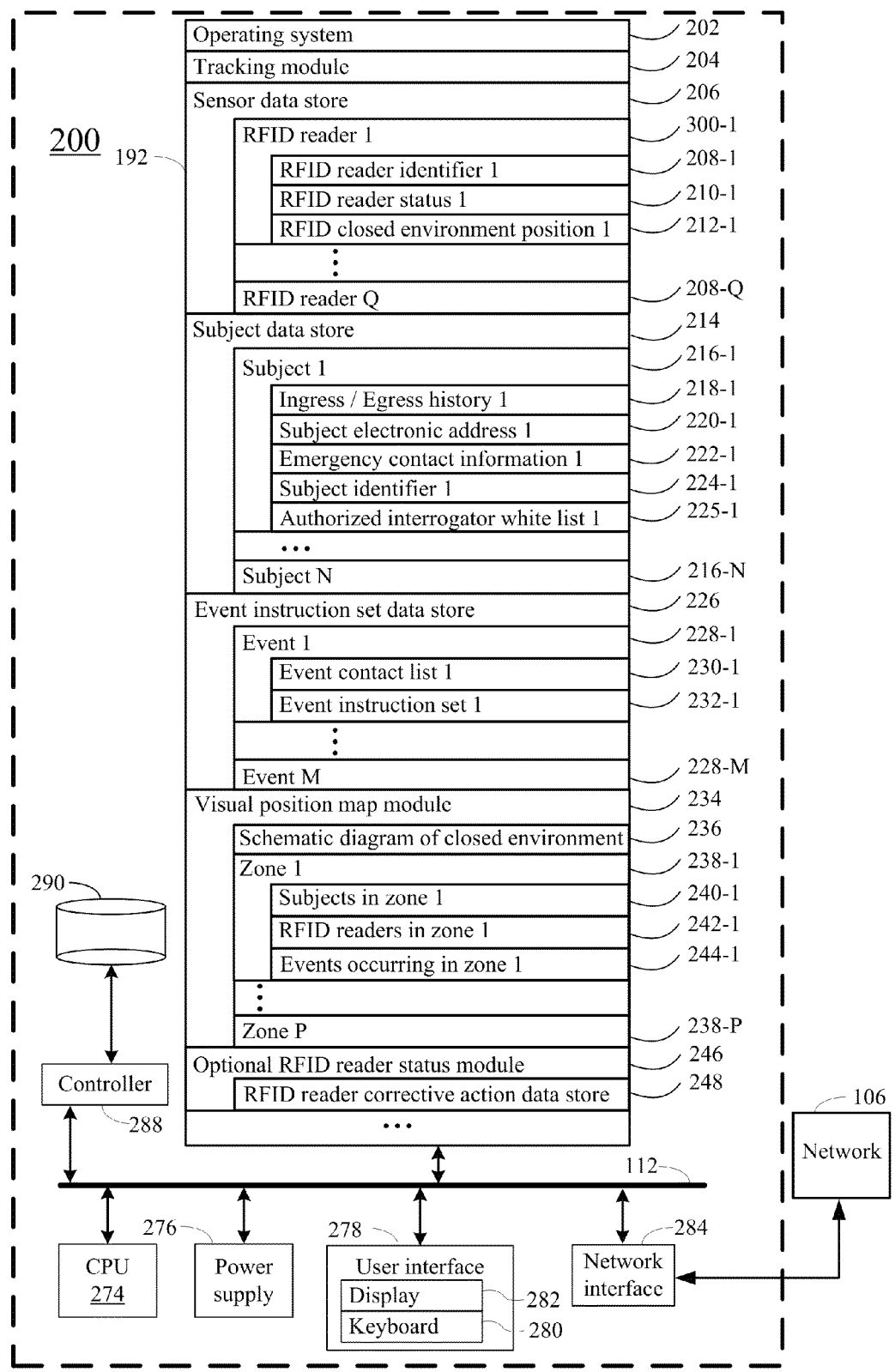
FIG. 2 illustrates a response computer system in accordance with an embodiment of the present disclosure.

Referring to FIG. 2, in typical embodiments, a response computer system 200 comprises one or more computers. For purposes of illustration in FIG. 2, the response computer system 200 is represented as a single computer that includes all of the functionality of the response computer system 200. However, the disclosure is not so limited. The functionality of the response computer system 200 may be spread across any number of networked computers and/or reside on each of several networked computers and/or by hosted on one or more virtual machines at a remote location accessible across the communications network 106. One of skill in the art will appreciate that a wide array of different computer topologies are possible for the response computer system 200 and all such topologies are within the scope of the present disclosure.

Turning to FIG. 2 with the foregoing in mind, an exemplary response computer system 200 comprises one or more processing units (CPU's) 274, a network or other communications interface 284, a memory 192 (e.g., random access memory), one or more magnetic disk storage and/or persistent devices 290 optionally accessed by one or more controllers 288, one or more communication busses 112 for interconnecting the aforementioned components, and a power supply 276 for powering the aforementioned components. Data in memory 192 can be seamlessly shared with non-volatile memory 290 using known computing techniques such as caching. Memory 192 and/or memory 290 can include mass storage that is remotely located with respect to the central processing unit(s) 274. In other words, some data stored in memory 192 and/or memory 290 may in fact be hosted on computers that are external to response computer system 200 but that can be electronically accessed by the response computer system over an Internet, intranet, or other form of network or electronic cable (illustrated as element 106 in FIG. 2) using network interface 284.

The memory 192 of response computer system 200 stores:
- an operating system 202 that includes procedures for handling various basic system services;
- a tracking module 204 for tracking a plurality of subjects as they enter and leave a closed environment 236 with a plurality of entries 50, and as they enter and leave zones (e.g., rooms, buildings, mine shafts) within the closed environment that are gated by RFID readers;
- a sensor data store 206 that includes, for each respective RFID reader 300 in a plurality of RFID readers, a location (position) 212 in the closed environment 236 of the respective RFID reader, a unique reader identifier 208 of the respective RFID reader, and, optionally, a status 210 of the RFID reader;
- a subject data store 214, the subject data store comprising a respective record of each corresponding subject 216 in a plurality of subjects tracked by the disclosed systems, each respective record including (i) a history 218 of ingress into and egress from the closed environment 236 by the corresponding subject, the history 218 further including in some embodiments ingress and egress from defined partitions within the closed environment, (ii) one or more electronic addresses 220 associated with the corresponding subject, (iii) a unique subject identifier 224 associated with the corresponding subject, (iv), optionally, emergency contact information 222 for the corresponding subject, and (v), optionally, an authorized interrogator white list 225 for the corresponding subject;
- an event instruction set data store 226 comprising a plurality of event instructions sets 232, each respective event instruction set 232 in the event instruction set data store 226 corresponding to an event 228 in a plurality of events, or a subset of events in the plurality of events, and optionally including an event contact list 230;

a visual position map module 234 for maintaining a visual position map, the visual position map comprising a respective position, on a schematic diagram 236 of the closed environment, of each subject 216 bearing a passive RFID tag detected by at least one of the plurality of RFID readers 300, the visual position map including a plurality of zones 238, and for each respective zone 238 a listing or other information construct (e.g., icon) identifying the subjects in the respective zone 240, an identity of the RFID readers 300 in or gating the respective zone 242, and the events occurring in the respective zone 244;

an optional RFID reader status module 246 that maintains an RFID reader status of each RFID reader 300 in the plurality of RFID readers and that receives, on a recurring basis, a respective status signal from each respective RFID reader in the plurality of RFID readers, where the respective status signal indicates a status of the respective RFID reader, the reader status module 246 further including instructions for analyzing each respective status signal for the status of the corresponding RFID reader and, based on this analysis, determining an RFID corrective action in consultation with an RFID reader corrective action data store 248.

In some implementations, one or more of the above identified data elements or modules of the response computer system 200 are stored in one or more of the previously mentioned memory devices, and correspond to a set of instructions for performing a function described above. The above identified data, modules or programs (e.g., sets of instructions) need not be implemented as separate software programs, procedures or modules, and thus various subsets of these modules may be combined or otherwise re-arranged in various implementations. In some implementations, the memory 192 and/or 290 optionally stores a subset of the modules and data structures identified above. Furthermore, in some embodiments the memory 192 and/or 206 stores additional modules and data structures not described above.

Figure 3:
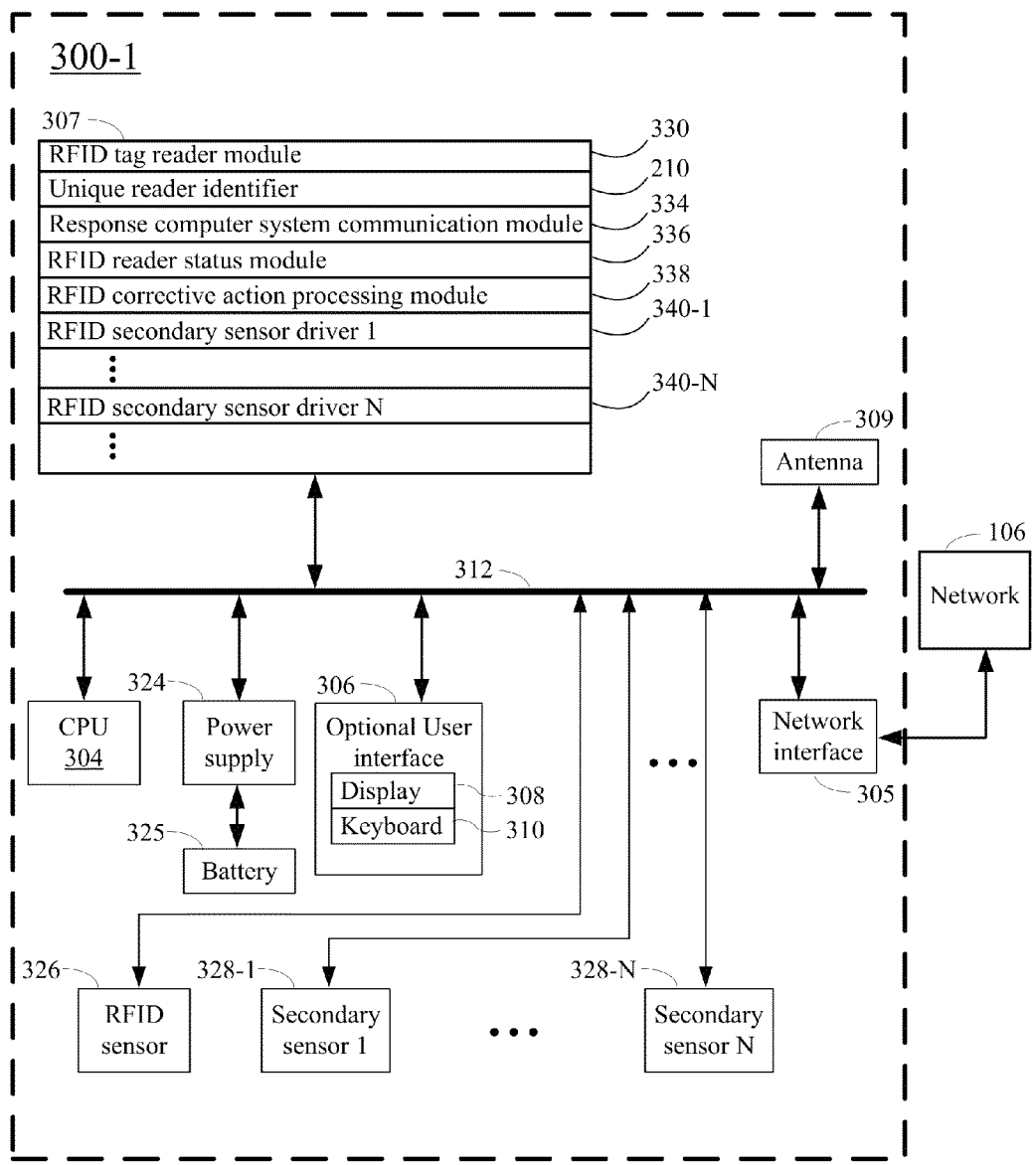
FIG. 3 illustrates an RFID reader, in accordance with an embodiment of the present disclosure.

Turning to FIG. 3, in typical embodiments, an RFID reader 300 comprises:
one or more processing units (CPU's) 304;
a network or other communications interface 305;
a memory 307;
an optional user interface 306, the optional user interface 306 including a display 308 and a keyboard or keypad or other data entry device 310;
an RFID sensor 326;
an antenna 309 for facilitating ultra high frequency RFID in which power is transmitted in the form of a radio frequency to passive device RFID tags in the vicinity of the RFID reader (e.g., up to forty feet away) thereby powering such tags and for receiving responsive signals back from such RFID tags;
optionally, one or more secondary sensors 328 (e.g., cameras, temperature sensors, noise-level detectors, gas monitors, air flow meters, humidity sensors, pressure sensors, torque sensors, traffic sensors, vibration sensors, smoke sensors, etc.);
one or more communication busses 312 for interconnecting the aforementioned components;
a power supply 324 for powering the aforementioned components; and
a battery 325 that serves as auxiliary back-up power.

Typically, an RFID reader 300 comprises an RFID tag reader module 330 for driving the RFID sensor 326 to read a unique subject identifier 224 from a passive RFID tag in the possession of a corresponding subject 216 from a distance between the passive RFID tag and the RFID reader of up to forty feet.

In typical embodiments, the RFID tag, also known as a transponder, is a passive tag meaning that it has no power source attached to it and it harvests power for its operation from the incident electromagnetic field transmitted by the RFID reader 300. In typical embodiments, the RFID tag comprises Application Specific Integrated Circuits (ASICs) that are attached to a tag antenna. These ASICs are used to harvest energy from the antenna, communicate information to the RFID reader through the tag antenna and store information for later recovery, such as the unique tag identifier associated with the RFID tag. See "Radio Frequency Identification from System to Applications," ed. Mamun Bin Ibne Reaz, 2003, ISBN 978-953-51-1143-6, Chapter 7, "Design of a Zeroth Order Resonator UHF RFID Passive Tag Antenna with Capacitive Loaded Coplanar Waveguide Structures," by Muhammad Mubeen Masud and Benjamin D. Braaten, which is hereby incorporated by reference.

The RFID reader 300 emits an electromagnetic field which contains power and timing information for used by the passive RFID tag. If the RFID tag comes within range of the RFID reader 300, it receives the information from the RFID reader 300 which is fed to the RFID ASICs, and in response the ASIC switches it impedance states between a lower and a higher value in a predetermined fashion. In so doing the tag ASICs change the radar cross-section (RCS) of the tag antenna thus changing the backscattered power. This backscattered power is collected at the RFID reader 300 and is used for tag identification and information. The maximum distance for which an RFID reader 300 can successfully identify an RFID tag is termed a max read range. In some embodiments, the max read range is greater than 4 feet, greater than 8 feet, greater than 12 feet, and/or less than 40 feet.

Advantageously, in some embodiments, the RFID tags of the present disclosure include additional encrypted information, typically stored in one or more ASICs. This information is used to ensure the identity of the RFID tags and serves to prevent nefarious copying of the information in RFID tags with the intent of making counterfeit tags. In some embodiments, this information is encrypted using public key/private key encryption to prevent counterfeit RFID tags. Moreover, in some embodiments the additional information that is stored in encrypted form in the RFID tags serves functional roles, such as informing the RFID reader 300 of an RFID's tag data bank capacity, RFID tag attributes (wrist band, ID card, insert, etc.), a data format identifier, the tag issuing entity for the RFID, the date the RFID tag was issued, the RFID tag type, the asset identifier (e.g., for tags associated with assets rather than human subjects) that is uniquely associated with the RFID tag, special privileges (including privilege identifiers and whether the corresponding subject has these privileges) associated with the corresponding subject, whether or not extended information is present on the RFID tag, extended information format ID, extended information size, and extended information content. In this way, highly secure systems are established in which RFID readers 300 read encrypted identifying information from RFID tags.

In some embodiments, device 102 includes a UHF RFID reader and one or more applications running in the memory of the device 102 that use the UHF RFID reader to simulate an UHF RFID tag. In such embodiments, the application stores the encrypted information referenced above including a unique RFID tag identifier. Thus, in some embodiments, the RFID tag associated with an individual subject is in the same device 102 associated with the individual subject.

Typically, each RFID reader 300 has a unique reader identifier 210. Moreover, the RFID reader 300 typically further comprises a response computer system communication module 334 for providing the response computer system 200 with indication data encompassing the ingress or egress of subjects 216 bearing such passive RFID tags through entries 50 in the plurality of entries of the closed environment, the indication data including (i) the unique subject identifier 224 read off the passive RFID tag in the possession of a subject 216 and (ii) the unique reader identifier 210 of the RFID reader 300. In some embodiments, the response computer system communication module 334 further provides the response computer system 200 with indication data encompassing the ingress or egress of subjects 216 bearing such passive RFID tags into zones within the closed environment, the indication data including (i) the unique subject identifier 224 read off the passive RFID tag in the possession of a subject 216 and (ii) the unique reader identifier 210 of the RFID reader 300.

Typically, each RFID reader 300 has an RFID reader status module 336 that polls for the status of the RFID reader 300. Examples of reader health status include, but are not limited to, antenna 309 orientation (e.g., correct, incorrect, etc.), reader connectivity (e.g., connected, lost network 106 connectivity, unreliable connectivity to network 106, etc.), reader authentication failure, reader software version (all modules up to date, modules out of date, etc.), reader software upgrade success status (e.g., successful, not successful, etc.), reader command response failure, reader power status (e.g., reader being powered by back up battery 325, reader power ok, reader battery 325 critically low, reader battery 325 not charging), reader lost read data in buffer due to bad connection (buffer overflow), reader critical software error followed by error code (e.g., divide by zero), last reader power down ungraceful, duplicate reader IP address, and reader does not have an assigned location in sensor data store 206 (e.g., reader not fully registered).

Typically, each RFID reader 300 has an RFID corrective action processing module 338 that implements corrective action instructions received from the response computer system 200. In embodiments where the RFID reader 300 includes one or more secondary sensors 328, there are corresponding RFID secondary sensor drivers 340 to control the sensors 328 and acquire data from them for communication to the response computer system 200.

Figure 4A:
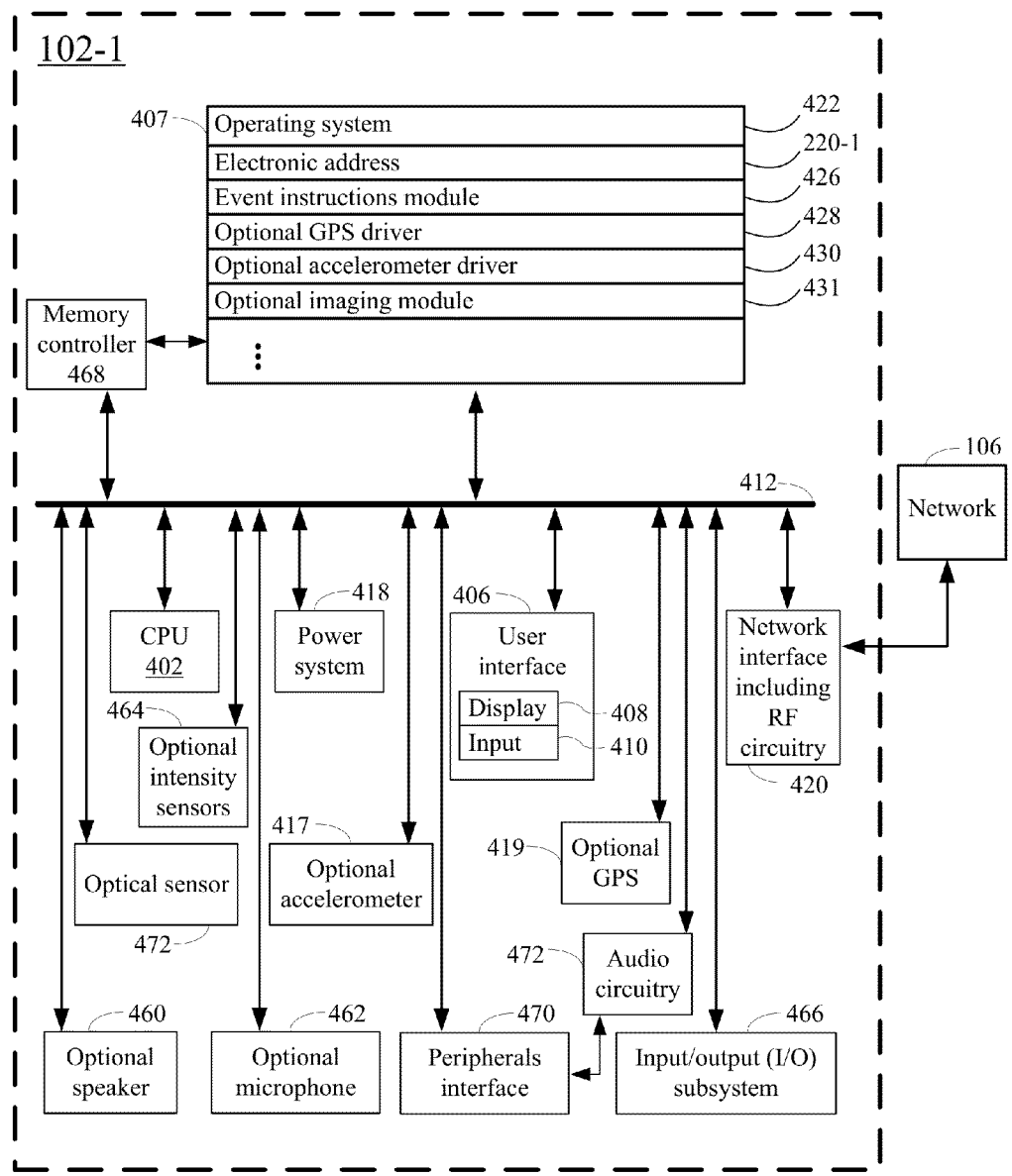
FIG. 4A illustrates a device associated with a subject that is supported by the disclosed tracking services, in accordance with an embodiment of the present disclosure.

In some embodiments, referring to FIG. 4A, a device 102 responsive to an electronic address 220 of subject 216 is a smart phone (e.g., an iPHONE), laptop, tablet computer, desktop computer, or other form of electronic device (e.g., a gaming console). However, any device that can receive text messages will suffice as a device 102. In some embodiments, a device 102 is not mobile. In some embodiments, a device 102 is mobile. FIG. 4A provides a description of a device 102 that can be used with the instant disclosure. It has one or more processing units (CPU's) 402, peripherals interface 470, memory controller 468, a network or other communications interface 420, a memory 407 (e.g., random access memory), a user interface 406, the user interface 406 including a display 408 and input 410 (e.g., keyboard, keypad, touch screen), an optional accelerometer 417, an optional GPS 419, optional audio circuitry 472, an optional speaker 460, an optional microphone 462, one or more optional intensity sensors 464 for detecting intensity of contacts on the device 102 (e.g., a touch-sensitive surface such as a touch-sensitive display system 408 of the device 102), optional input/output (I/O) subsystem 466, one or more optional optical sensors 472, one or more communication busses 412 for interconnecting the aforementioned components, and a power system 418 for powering the aforementioned components. In some embodiments, the input 410 is a touch-sensitive display, such as a touch-sensitive surface. In some embodiments, the user interface 406 includes one or more soft keyboard embodiments. The soft keyboard embodiments may include standard (QWERTY) and/or non-standard configurations of symbols on the displayed icons.

Device 102 optionally includes, in addition to accelerometer(s) 417, a magnetometer (not shown) and a GPS 419 (or GLONASS or other global navigation system) receiver for obtaining information concerning the location and orientation (e.g., portrait or landscape) of device 102.

It will be appreciated that device 102 is only one example of a multifunction device, and that device 102 optionally has more or fewer components than shown, optionally combines two or more components, or optionally has a different configuration or arrangement of the components. The various components shown in FIG. 4A are implemented in hardware, software, firmware, or a combination thereof, including one or more signal processing and/or application specific integrated circuits.

Memory 407 optionally includes high-speed random access memory and optionally also includes non-volatile memory, such as one or more magnetic disk storage devices, flash memory devices, or other non-volatile solid-state memory devices. Access to memory 407 by other components of device 102, such as CPU(s) 407 is, optionally, controlled by memory controller 468.

Peripherals interface 470 can be used to couple input and output peripherals of the device to CPU(s) 402 and memory 407. The one or more processors 402 run or execute various software programs and/or sets of instructions stored in memory 407 to perform various functions for device 102 and to process data.

In some embodiments, peripherals interface 470, CPU(s) 402, and memory controller 468 are, optionally, implemented on a single chip. In some other embodiments, they are, optionally, implemented on separate chips.

RF (radio frequency) circuitry 108 of network interface 420 receives and sends RF signals, also called electromagnetic signals. RF circuitry 108 converts electrical signals to/from electromagnetic signals and communicates with communications networks and other communications devices via the electromagnetic signals. RF circuitry 420 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks 106. In some embodiments, circuitry 108 does not include RF circuitry and, in fact, is connected to network 106 through one or more hard wires (e.g., an optical cable, a coaxial cable, or the like).

Examples of networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, audio circuitry 472, speaker 460, and microphone 462 provide an audio interface between a subject and device 102. The audio circuitry 472 receives audio data from peripherals interface 470, converts the audio data to an electrical signal, and transmits the electrical signal to speaker 460. Speaker 460 converts the electrical signal to human-audible sound waves. Audio circuitry 472 also receives electrical signals converted by microphone 462 from sound waves. Audio circuitry 472 converts the electrical signal to audio data and transmits the audio data to peripherals interface 470 for processing. Audio data is, optionally, retrieved from and/or transmitted to memory 407 and/or RF circuitry 420 by peripherals interface 470.

In some embodiments, power system 418 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, device 102 optionally also includes one or more optical sensors 472. Optical sensor(s) 472 optionally include charge-coupled device (CCD) or complementary metal-oxide semiconductor (CMOS) phototransistors. Optical sensor(s) 472 receive light from the environment, projected through one or more lens, and converts the light to data representing an image. In conjunction with imaging module 431 (also called a camera module), optical sensor(s) 472 optionally capture still images and/or video. In some embodiments, an optical sensor is located on the back of device 102, opposite display system 408 on the front of the device, so that the touch screen is enabled for use as a viewfinder for still and/or video image acquisition. In some embodiments, another optical sensor 472 is located on the front of the device 102 so that the subject's image is obtained (e.g., to verify the identity of the subject, to assure responders that the subject is in good health, or to help diagnose a subject's condition remotely, etc.).

As illustrated in FIG. 4A, a device 102 preferably comprises an operating system 422 that includes procedures for handling various basic system services. Operating system 422 (e.g., iOS, DARWIN, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A device 102 further comprises an electronic address 220 (a mobile phone number, social media account, or e-mail address) associated with the corresponding subject that is used by the response computer system 200 to address event instructions 232 to the subject when events 228 occur in the closed environment and the subject is, for example, within the closed environment 236.

The device 102 further comprises an event instructions module 426 for communicating with the response computer system 200 to obtain such event instructions 232 and to display such instructions. In some embodiments event instructions module 426 provides response computer system 200 with information regarding the subject, such as GPS coordinates, if available, using optional GPS driver 428/optional GPS 419 and/or subject movement using optional accelerometer driver 430/optional accelerometer 417.

Figure 4B:
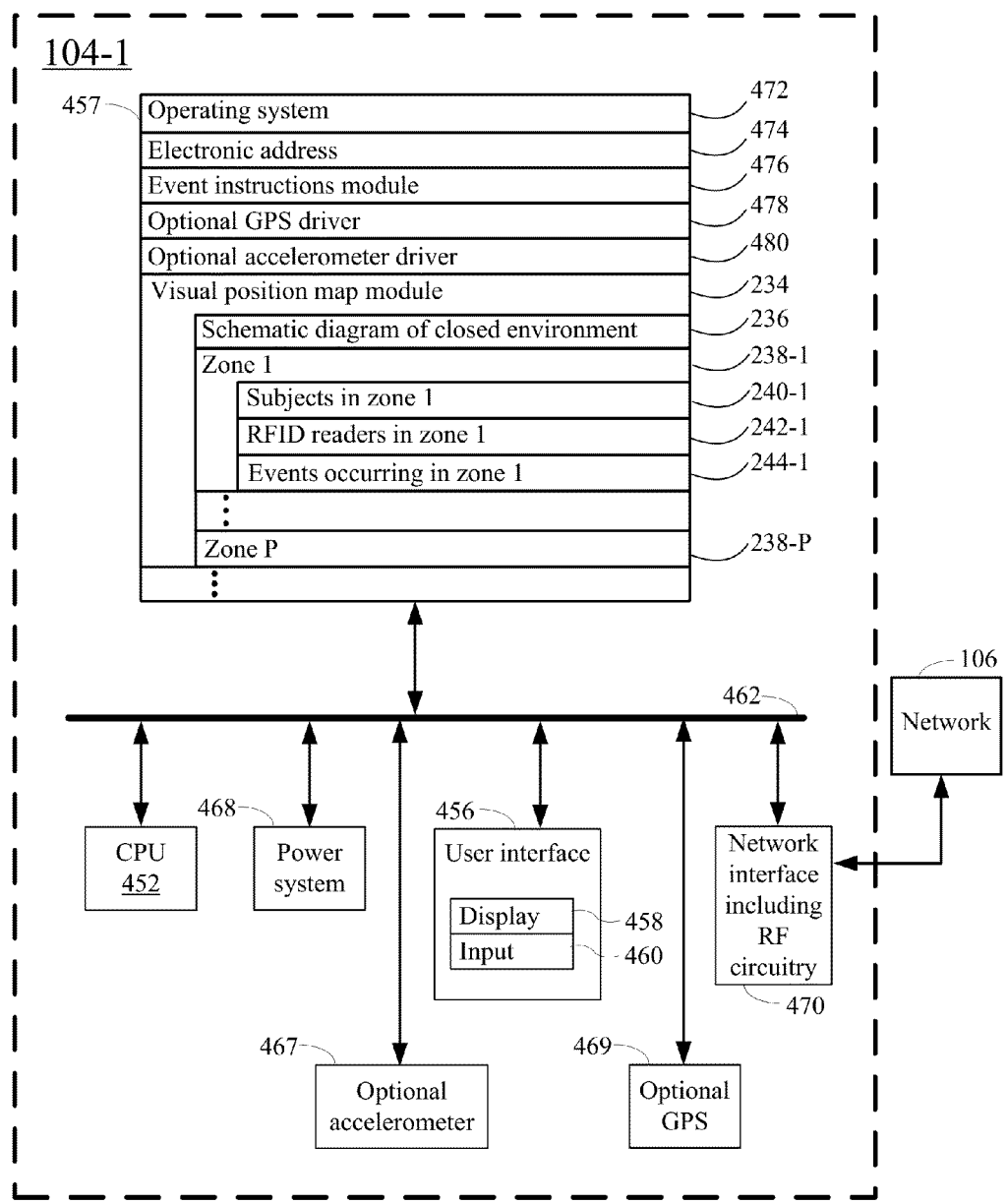
FIG. 4B illustrates a device associated with an event responder, system administrator, zone attendant and/or caretaker, in accordance with an embodiment of the present disclosure.

In some embodiments, referring to FIG. 4B, a device 104 associated with an event responder, system administrator, zone attendant and/or caretaker, is a smart phone. In other embodiments, a device 104 is not a smart phone but rather is a tablet computer, desktop computer, emergency vehicle computer, or other form or wired or wireless networked device. In some embodiments, device 104 has any or all of the circuitry, hardware components, and software components found in the device 102 depicted in FIG. 4A. In the interest of brevity and clarity, only a few of the possible components of device 104 are shown in order to better emphasize the additional software modules that are installed on device 104.

In typical embodiments, device 104 has one or more processing units (CPU's) 452, a network or other communications interface 470, a memory 457 (e.g., random access memory), a user interface 456, the user interface 456 including a display 458 and input 460 (e.g., keyboard, keypad, touch screen), an optional accelerometer 467, an optional GPS 469, one or more communication busses 462 for interconnecting the aforementioned components, and a power system 468 for powering the aforementioned components. In some embodiments, the input 460 is touch-sensitive display, such as a touch-sensitive surface. In some embodiments, the user interface 456 may include one or more soft keyboard embodiments. The soft keyboard embodiments may include standard (QWERTY) and/or non-standard configurations of symbols on the displayed icons.

Device 104 optionally includes, in addition to accelerometer(s) 417, a magnetometer (not shown) and a GPS 419 (or GLONASS or other global navigation system) receiver for obtaining information concerning the location and orientation (e.g., portrait or landscape) of device 104.

It should be appreciated that device 104 is only one example of a portable multifunction device, and that device 104 optionally has more or fewer components than shown in FIG. 4B (or in FIG. 4A), optionally combines two or more components, or optionally has a different configuration or arrangement of the components. The various components shown in FIG. 4B are implemented in hardware, software, firmware, or a combination thereof, including one or more signal processing and/or application specific integrated circuits.

As illustrated in FIG. 4B, a device 104 preferably comprises an operating system 472 that includes procedures for handling various basic system services. A device 104 further comprises an electronic address 474 (e.g., a mobile phone number, social media account, or e-mail address) associated with the event responder, system administrator, zone attendant and/or caretaker that is used by the response computer system 200 to address event instructions 232 pertaining to this person.

The device 104 further comprises an event instructions module 476 for communicating with the response computer system 200 to obtain such event instructions 232 and to display them. In some embodiments, event instructions module 426 provides response computer system 200 information regarding the holder of device 104, such as GPS coordinates, when available, using optional GPS driver 478/optional GPS 419 and/or subject movement using optional accelerometer optional driver 480/optional accelerometer 467. Such information is useful to coordinate efforts between event responders and subjects in the closed environment 216. For example, the response computer system 200 can notify subjects with detailed information on how far away rescuers are during an event. In many event scenarios such information is particularly useful to subjects in need of rescue, such as subjects in a burning skyscraper or subjects trapped in a mine.

In some embodiments, response computer system 200 transmits instructions for formatting, for display, the visual position map, with a respective icon at the position on the schematic diagram of the closed environment 236 of each subject bearing a passive RFID tag detected by at least one of the plurality of RFID readers and a location 212 of each RFID reader 300 in the plurality of readers, on the device 104 associated with the event responder, system administrator, zone attendant and/or caretaker. In such embodiments, device 104 includes a visual position map module 234 for maintaining the visual position map. In some embodiments, the visual position map includes a plurality of zones 238, and for each respective zone 238, provides a listing or some other information construct that identifies the subjects in the respective zone 240, optionally an identity of the RFID readers 300 in the respective zone 242, and optionally the events occurring in the respective zone 244. This information is useful for responders so that they may determine where the subjects in need of rescue or other intervention are located in the closed environment.

In some embodiments, the visual position map includes a plurality of zones 238, and for each respective zone 238, provides a listing or some other information construct that identifies the subjects in the respective zone 240, an identity of the RFID readers 300 in the respective zone 242, and the events occurring in the respective zone 244.

Now that details of a system 48 for tracking a plurality of subjects in a closed environment 236 have been disclosed, details regarding a flow chart of processes and features of the network, in accordance with an embodiment of the present disclosure, are disclosed with reference to FIGS. 5 through 12.

Figure 6:
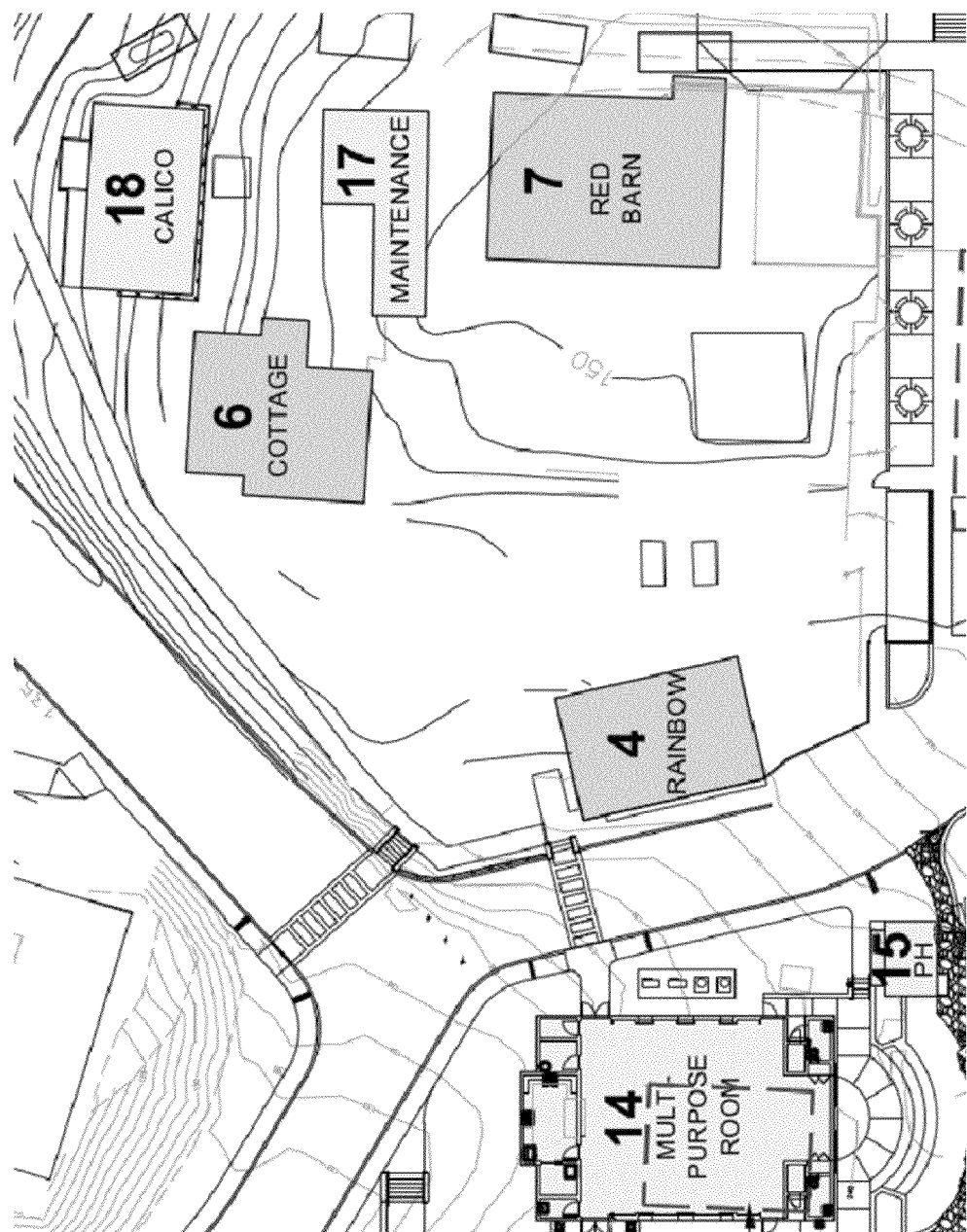
FIG. 6 illustrates a visual position map including a schematic diagram of a closed environment that includes multiple building and multiple open spaces in accordance with an embodiment of the present disclosure.

Block 502. A radio frequency identification (RFID) network 48 for tracking a plurality of subjects in a closed environment with a plurality of entries 50 is provided. FIG. 6 illustrates one such closed environment. As illustrated in FIG. 6, the closed environment can include multiple buildings (e.g., building 14—multipurpose room, building 4—rainbow room, building 6—cottage, building 18—calico, building 17—maintenance, building 7—red barn. As illustrated in FIG. 6, alternatively, a closed environment can be a floor in a building, to give another non-limiting example.

Figure 7:
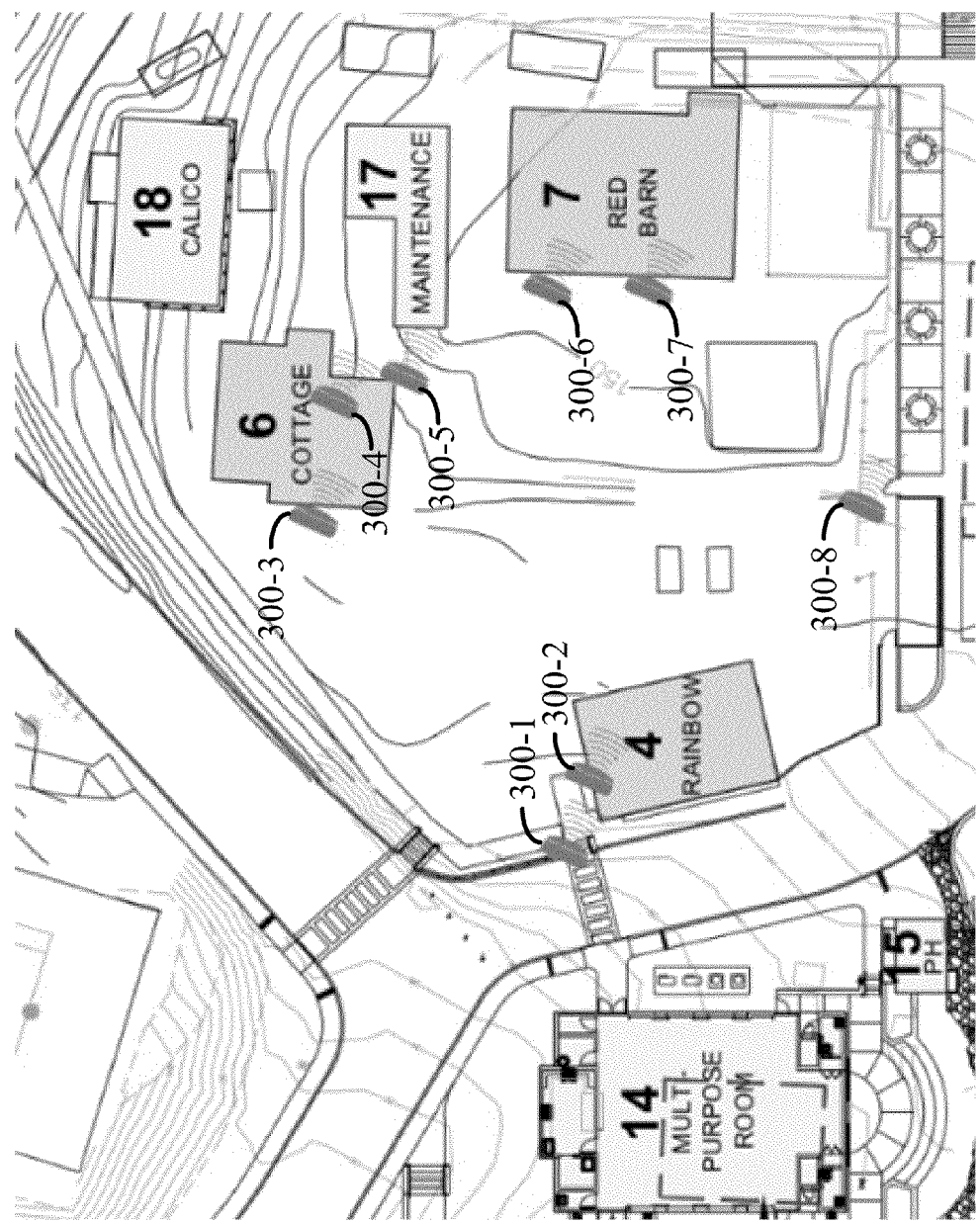
FIG. 7 illustrates a visual position map including a schematic diagram of a closed environment, with a respective icon at the position on the schematic diagram of each RFID reader in a plurality of RFID readers in accordance with an embodiment of the present disclosure.

The network comprises a plurality of RFID readers distributed across the environment and a response computer system. In some embodiments, the closed environment is functionally defined by RFID readers of the plurality of RFID readers that are positioned at one or more entries into the environment, together with any physical barriers of the closed environment (e.g., building walls, fences, cliffs, mine shafts, etc.). As such, each respective RFID reader 300 in a first subset of the readers is positioned at one of the entries. FIG. 7 illustrates. In FIG. 7, the closed environment of FIG. 6 is now depicted with a plurality of RFID readers. RFID readers 300-1 and 3008-8 of FIG. 7 are at entries into the closed environment whereas the remaining RFID readers define zones within the closed environment.

Each RFID reader 300 includes a unique reader identifier 208 and is in communication with the response computer system. The response computer system comprises memory and one or more processors. A sensor data store 206, stored in the memory, includes, for each respective RFID reader 300, a location in the closed environment and the unique reader identifier 208 of the RFID reader 300.

Instructions, stored in the memory and configured for execution by the one or more processors, when executed by the one or more processors, cause the response computer system 200 to execute a method including receiving indication data. The indication data encompasses the ingress or egress of each respective subject 216 in the plurality of subjects bearing a passive RFID tag through the plurality of entries.

In some embodiments, this indication data includes, for each respective subject 216, (i) a unique subject identifier 224 read off a passive RFID tag in the possession of the respective subject 216 by a corresponding RFID reader 300 from a distance between the passive RFID tag and the corresponding RFID reader 300 of up to forty feet and (ii) the reader identifier 208 of the corresponding RFID reader 300. Advantageously, in typical embodiments, ultra high frequency RFID is used in which RFID tag reader module 330 transmits power in the form of a radio frequency to completely passive RFID tags born by subjects 216, thereby powering such RFID tags with the radio frequency and for receiving a response back from such RFID tags, the response including the subject identifier of the subjects bearing the RFID tags. In this way, advantageously, the subject identifiers of subjects in the vicinity (e.g., up to 10 feet, up to 20 feet, up to forty feet) of each RFID reader 300 is acquired without any requirement that the RFID tags have a power source.

In some embodiments (504), the closed environment comprises a plurality of internal zones, and each respective RFID reader 300 in a second subset of the plurality of RFID readers is positioned at an entry of an internal zone 238 in the plurality of internal zones. For example, in FIG. 1, RFID readers 300-3 and 300-4 are at entries into the closed environment and thus constitute the first subset of RFID readers whereas RFID readers 300-1 and 300-2 define zones within the closed environment and thus constitute the second subset of the plurality of RFID readers.

In some embodiments (506), the closed environment is a warehouse, a manufacturing facility, a refinery, a school, a business campus, a cruise ship, a subject transportation hub, a government facility, a military installation, a conference center, a medical campus facility, a correctional facility, hotel or a mine. These are just illustrative examples. In some embodiments, a closed environment is defined by a set of RFID readers positioned at entries, together with any physical barriers that the environment provides (e.g., walls, etc.) such that all customary exits and entries into and out of the closed environment (doorways as opposed to windows in the case of closed environments that are single buildings, walkways and driveways in the case of closed environments that are multi-building campuses, etc.) are monitored by an RFID reader. As such, in some embodiments (508), the closed environment includes one or more buildings and one or more predefined open areas. In some embodiments (510), the passive RFID tag is in a badge carried by or held by the subject 216.

While attention has been given to subjects that are human, the present disclosure is not so limited. The disclosed system can be just as easily used for inventory purposes, such as to track heavy mobile equipment at a construction site. As such, in some embodiments (512), at least some of the subjects in the plurality of subjects are chattels (e.g., portable equipment). In some embodiments, some of the subjects are automobiles and the closed environment is an auto dealership. In some embodiments, some of the subjects are railroad cars and the closed environment is a railroad switching station. In some embodiments, some of the subjects are buses and the closed environment is a bus station. In some embodiments, some of the subjects are subway rail cars or entire subway trains and the closed environment is a subway station or subway system (e.g., Bay Area Rapid Transit). In alternative embodiments, all of the subjects are humans and the closed environment is an auto dealership, railroad switching station, bus station, subway station, or subway system.

In some embodiments (514), at least a subset of the subjects in the plurality of subjects are humans or animals. In some embodiments (514), all of the subjects in the plurality of subjects are animals (e.g., cows, sheep, horses) and the closed environment is a farm or a barn.

Block 516. A visual position map is maintained based on the indication data of block 502. The visual position map comprises a respective position 212, on a schematic diagram 236 of the closed environment, of each subject 216 bearing a passive RFID tag detected by at least one of the plurality of RFID readers.

Figure 8:
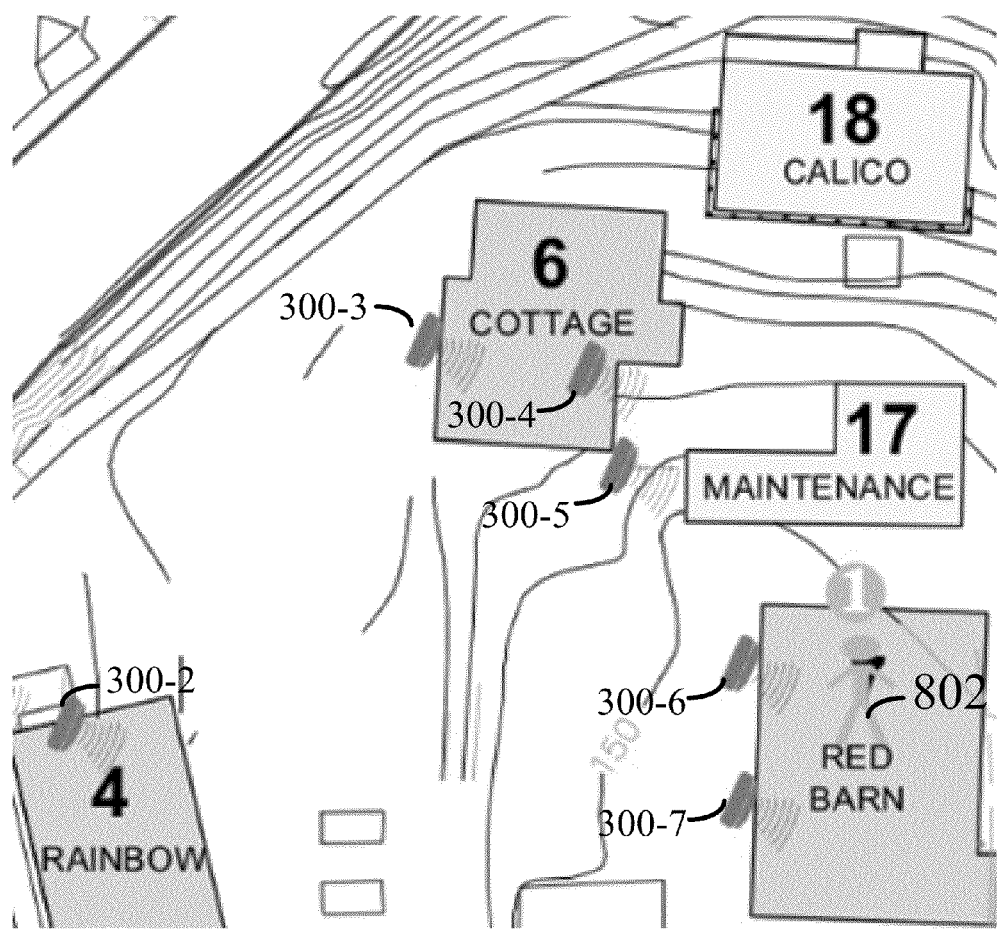
FIG. 8 illustrates a visual position map including a schematic diagram of a closed environment, with a respective icon at the position on the schematic diagram of each RFID reader in a plurality of RFID readers, and with an icon indicating the presence of a first subject bearing a passive RFID tag detected by at least one RFID reader in the plurality of RFID readers in a first zone in the schematic diagram, in accordance with an embodiment of the present disclosure.
Figure 9:
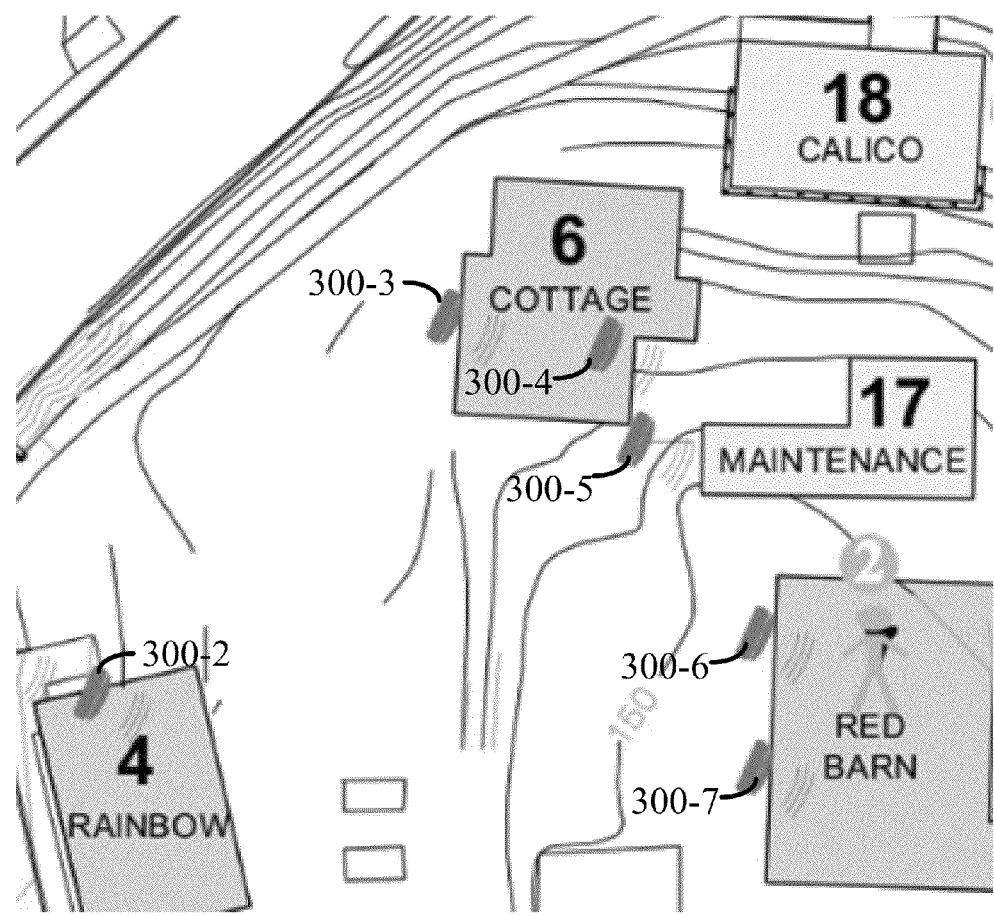
FIG. 9 illustrates the visual position map of FIG. 8, in which an additional subject has been detected in the first zone by at least one RFID reader in the plurality of RFID readers, in accordance with an embodiment of the present disclosure.

In some embodiments, the visual position map is displayed, with a respective icon at the position on the schematic 236 of the closed environment of each subject 216 bearing a passive RFID tag detected by at least one reader in the plurality of RFID readers (518). FIG. 8 illustrates this. The zone "red barn" has a single subject 216. Thus, there is an icon 802 over the "red barn" zone indicating a single "1" subject.

In some embodiments, responsive to receiving a signal from an RFID reader 300 in the plurality of RFID readers that a subject 216 has moved from a first position to a second position in the closed environment, the visual position map is updated by changing a position of the icon corresponding to the subject 216 to reflect the second position (520). Thus, referring to FIG. 8, if the subject in the "red barn" zone were to move to the "cottage" zone, the visual position map would be updated by changing a position of the icon corresponding to the subject 216 to reflect the second position. In other words, the codon 802 would move from the red barn to the cottage in real time when the subject went from the red barn to the cottage.

In some embodiments, the closed environment comprises a plurality of internal zones, and each respective RFID reader 300 in a second subset of the plurality of RFID readers is positioned at an entry of an internal zone 238 in the plurality of internal zones. This is illustrated in FIG. 7, in which RFID readers 300-1 and 300-8 are at closed environment entries whereas as the remaining RFID readers define internal zones. For instance, RFID readers 300-3 and 300-4 define the "cottage" internal zone, RFID reader 300-5 define the "maintenance" internal zone, and RFID readers 300-6 and 300-7 define the "red barn" internal zone. In some such embodiments, a first internal zone 238 in the plurality of internal zones is monitored by a zone attendant. Thus, referring to FIG. 7 to illustrate, in some embodiments a zone attendant monitors the "cottage" zone. An identity of each subject 216 in the first internal zone 238 (e.g., the "cottage zone") is determined from the visual position map, and the identity of each subject 216 in the first internal zone 238 is communicated to a device 104 associated with the zone attendant (522). For example, in some embodiments, the zone attendant receives a list of all subjects in the "cottage" zone.

Block 524. An RFID reader status module 246 maintains an RFID reader status 210 of each RFID reader 300 in the plurality of RFID readers. The RFID reader status module 246 also receives, on a recurring basis (e.g., every minute, every five minutes, every hour, every day, and/or on an irregular basis such as only when an adverse RFID health status is incurred), a respective status signal from each respective RFID reader 300 in the plurality of RFID readers. The respective status signal indicates an RFID reader status 210 of the respective RFID reader 300. The RFID reader status module 246 analyzes each respective status signal for the RFID reader status 210 of the corresponding RFID reader 300. Examples of reader health status include, but are not limited to, antenna 309 orientation (e.g., correct, incorrect, etc.), reader connectivity (e.g., connected, lost network 106 connectivity, unreliable connectivity to network 106, etc.), reader authentication failure, reader software version (all modules up to date, modules out of date, etc.), reader software upgrade success status (e.g., successful, not successful, etc.), reader command response failure, reader power status (e.g., reader being powered by back up battery 325, reader power ok, reader battery 325 critically low, reader battery 325 not charging), reader lost read data in buffer due to bad connection (buffer overflow), reader critical software error followed by error code (e.g., divide by zero), last reader power down ungraceful, duplicate reader IP address, and reader does not have an assigned location in sensor data store 206 (e.g., reader not fully registered).

Referring to 526, in some embodiments, the RFID reader status module 246 further transmits a status query signal to a respective RFID reader 300 prior to obtaining a corresponding status signal, with the corresponding status signal being responsive to the status query signal. The RFID reader status module 246 maintains an RFID reader data store (not shown) for the plurality of RFID readers. The RFID reader data store comprises an RFID reader status 210, on a temporal basis, for each RFID reader 300 in the plurality of RFID readers. The RFID reader status module 246 maintains an RFID reader corrective action data store 248 comprising a respective RFID reader corrective action for each RFID reader health criterion in a plurality of RFID reader health criteria. In such embodiments, the analyzing of each respective status signal for the RFID reader status 210 of the corresponding RFID reader 300 additionally entails sending a corrective action signal comprising a respective RFID reader corrective action to an RFID reader 300 in the plurality of RFID readers when the RFID reader fails to satisfy an RFID health criterion in the plurality of RFID reader health criteria. This respective RFID reader corrective action is obtained from the RFID reader corrective action data store 248.

Block 528. Referring to block 528, a subject data store 214 is maintained. The subject data store 214 comprises a respective record of each subject 216 in the plurality of subjects. In some embodiments, a record for a subject includes (i) a history 218 of ingress into and egress from the closed environment by the subject, (ii) a subject electronic address 220 associated with the subject 216 (e.g., the electronic address of a device 104 associated with the subject), and (iii) a unique subject identifier 224 associated with the subject 216. In some embodiments, the subject electronic address 220 is a mobile phone number, social media account, or e-mail address associated with the subject 216 (530).

Referring to FIG. 5D, in some embodiments, selection instructions are received (532). The selection instructions specify (i) a subset of the closed environment and (ii) a message for all subjects in the subset of the closed environment. Advantageously, in some embodiments the visual position map and subject data store 214 is leveraged to facilitate such selection instructions. For instance, referring to FIG. 802, in some embodiments a map such as that depicted in FIG. 8 is displayed on a computer system 104 associated with an event responder. The event responder can use a mouse or, in the case where the display 104 is touch screen, a finger, to select, with a lasso movement, a portion of the closed environment (region of the closed environment) and thereby indicate that all subjects in that portion of the closed environment are to receive a customized message. The event responder further either types the message, speaks the message, or selects the message from a preexisting set of messages that is to be communicated to all subjects that are in the selected region of the closed environment. The collection of subjects in the plurality of subjects that are present in the selected region of the closed environment is determined by querying the visual position map for all subjects in the subset of the closed environment. In some embodiments, this is accomplished by querying subject data store for subject location based on their ingress/egress history 281. In other embodiments, such as the embodiment illustrated in FIG. 2, queries of subject data store are done on a zone by zone basis on an ongoing basis and used to populate the entries 240 of the visual position map. It will be appreciated that any number of data architectures are possible and FIG. 2 and this description is but a limited set of the numerous possibilities that are all within the scope of the present disclosure. In some embodiments, all or a portion of the visual position map module and the subject data store module are in fact in the same module. Regardless, of exact data structure, the disclosed systems and method advantageously obtain, for each respective subject 216 in the collection of subjects, the subject electronic address 220 associated with the respective subject 216 in the selected subset of the closed environment from the subject data store 214. The message is then communicated to the subject electronic address 220 of each subject 216 in the collection of subjects. In some embodiments, the subset of the closed environment selected by the event responder using a visual position map on device 104 is one or more internal zone, two or more internal zones, or three or more internal zones of the enclosed environment. In some embodiments, the subset of the closed environment selected by the event responder using a visual position map on device 104 is at least one entry into the closed environment and/or at least one internal zone of the closed environment. A working example of such embodiments is an event responder lassoing a region of the enclosed environment on a device 104 that is a smart phone and speaking into the smart phone 104 a message for subjects in the selected region specific instructions on how to escape the selected region in view of an ongoing event (telling the subjects to take stairwell A, not stairwell B out of the selected region because there is a fire in stairwell B).

In some embodiments, referring to FIG. 5D, an authorized interrogator white list 225 is maintained for a subject 216 in the plurality of subjects (534). The authorized interrogator white list 225 includes, for each respective authorized interrogator, an identity of the respective authorized interrogator and a remote device (e.g., device 104) associated with the respective authorized interrogator. An example of such an embodiment is a situation in which the subject 216 is a student and the white list 225 includes information for each of the student's close relatives or other caretakers. Continuing with this embodiment, there is received, across the data network (e.g., network 106), a remote interrogation request from an interrogator that is outside the plurality of subjects. As an example, the parent, hearing that there is a fire at the student's school, using an application running on device 104 to query as to the safety of the student. As such, the interrogation request includes an identity of the interrogator and an identity of the first subject 216. Responsive to the interrogation request, a determination is made, using the subject data store 214, as to whether the interrogator is in the authorized interrogator white list 225 for the first subject 216. In the case of the student/relative example, this determination is made to make sure that the interrogator (e.g., the parent) has authority to obtain location information for the student. When the interrogator is in the authorized interrogator white list 225 for the first subject 216, a location in the closed environment of the first subject 216 is obtained (e.g., from the ingress/egress history 1 of subject data store 214 and/or from the zone information of the visual position map maintained by the visual position map module 234) and communicated to the interrogator. In some embodiments, such information is communicated to the remote device 104 associated with the interrogator that is in the authorized interrogator white list 225. In other embodiments, such information is communicated to any device 104 that the authorized interrogator is using provided that the authorized interrogator has used the device 104 to adequately satisfy identification challenges (e.g., logins, passwords, etc.) posed by the response computer system 200. When the interrogator is not in the authorized interrogator white list 225 for the first subject 216, the location of the first subject 216 is not communicated to the interrogator.

Block 536. Referring to block 536 of FIG. 5D, an event instruction set data store 226 is also maintained. The event instruction set data store 226 includes event instructions set. Each respective event instruction set 232 in the event instruction set data store 226 corresponds to one or more events 228 in a plurality of events. Events include, but are not limited to all forms of natural disasters, violent crimes, bombing threats, health emergencies, building code violations (e.g., building capacity exceeded), crowd control (e.g., too many people in one cafeteria when another cafeteria is vacant), to name a few example event.

In some such embodiments (538 of FIG. 5E), a first event instruction set 232 in the instruction event set data store 226 corresponds to a first event 228 and includes (i) a first message that is to be sent to a first subset of subjects in the plurality of subjects on the basis that they are localized (e.g., by the visual position map or the ingress/egress history 218 of subject data store 214) to a first portion of the closed environment, without human intervention, responsive to the first event 228 at a time when the event occurs, and (ii) a second message that is to be sent to a second subset of subjects in the plurality of subjects on the basis that they are localized by the visual position map to a second portion of the closed environment, without human intervention, responsive to the first event 228 at a time when the event occurs. To illustrate, the message sent to subjects in the first portion (e.g., first zone) may be "Don't come into the zone second zone" while the message sent to subjects in the second portion (e.g., second zone) may be "Go this way because the fire is over here. Don't start running towards this exit, go this way." In response to receiving an indication that the first event 228 has occurred, an identity of the first and second subset of subjects is obtained from the visual position map (or the subject data store). Further, for each respective subject 216 in the first subset of subjects, the subject electronic address 220 associated with the respective subject 216 is obtained from the subject data store 214. The first message is communicated to the respective subject electronic address 220 of each subject 216 in the first subset of subjects. For each respective subject 216 in the second subset of subjects, the subject electronic address 220 associated with the respective subject 216 from the subject data store 214 is obtained. The second message is communicated to the mobile respective subject electronic address 220 of each subject 216 in the second subset of subjects. In some such embodiments, one of a respective GPS position or respective RFID reader location of each responder in a plurality of responders is transmitted to the first subset or the second subset of subjects (540). Such an embodiment has use, for example, when the role played by the first subset of subjects is different than that of the second subset of subjects. In one example, the first subset of subjects is managers, teachers, or emergency personnel whereas the second subset of subjects is hospital patients or students. As such, the first subset of subjects is likely to receive more information or different information, such as the locations of the event responders (e.g., rescue team), than the second subset of subjects.

Figure 10:
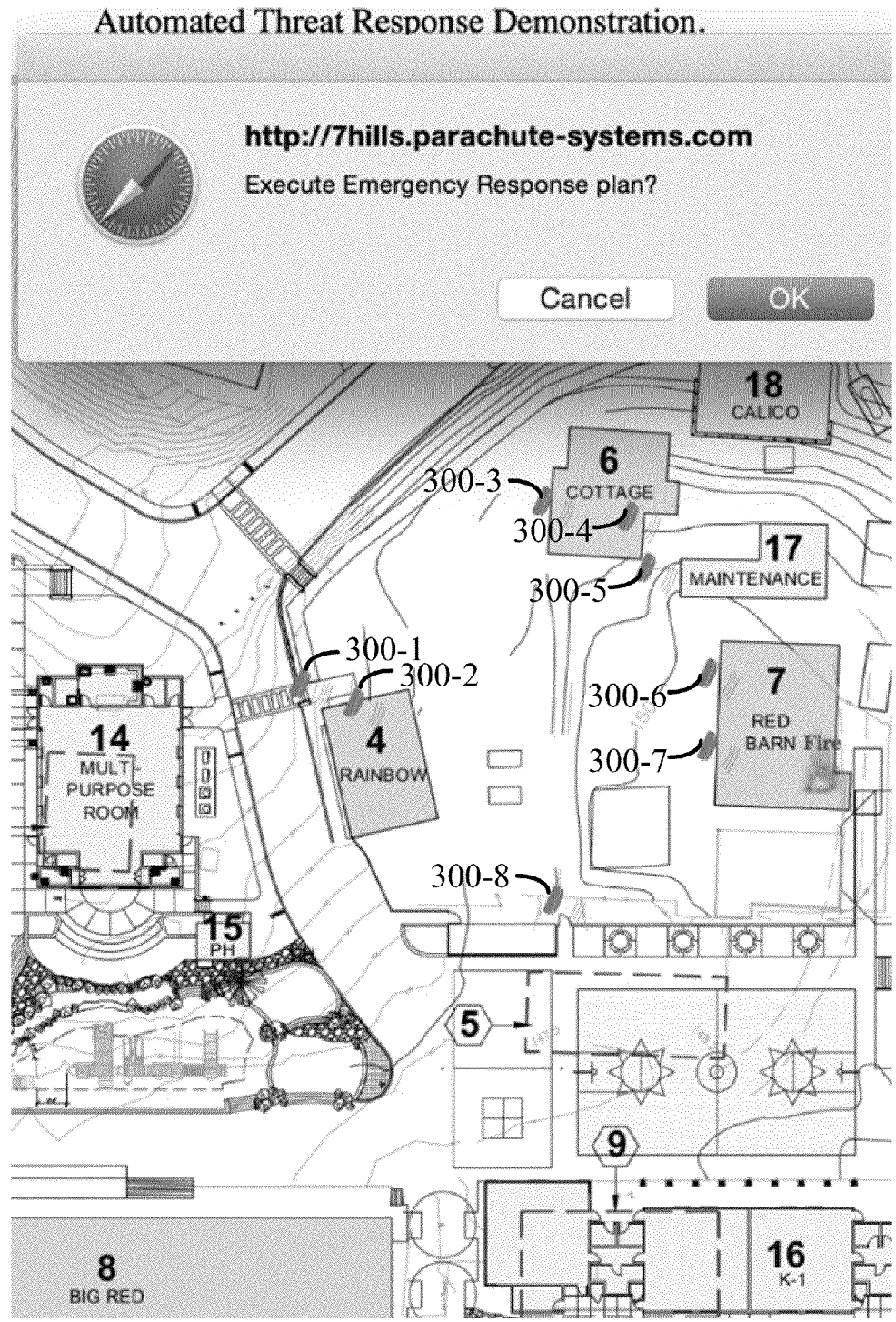
FIG. 10 illustrates a visual position map including a schematic diagram of a closed environment, with a respective icon at the position on the schematic diagram of each RFID reader in a plurality of RFID readers, and further indicates that an alert has occurred and further indicates the location of the alert on the schematic diagram, in accordance with an embodiment of the present disclosure.

In some embodiments (542), a first event 228 in the plurality of events transpires and there is displayed on the schematic diagram 236 (i) a position 212 of each RFID reader 300 in at least a subset of the plurality of RFID readers and (ii) a position of the first event 228. This is illustrated in FIG. 10. Each RFID reader 300 in the closed environment is depicted with an icon and the location of the event, here a fire, is also depicted on the schematic diagram of the closed event.

In some embodiments (544), a first event 228 in the plurality of events transpires, and the instructions further cause the response computer system 200 to, responsive to the first event 228, transmit instructions for formatting, for display, the visual position map, with a respective icon at the position on the schematic diagram 236 of the closed environment of each subject 216 bearing a passive RFID tag detected by at least one of the plurality of RFID readers and a location of each RFID reader 300 in the plurality of readers, on a remote computing device associated with a responder to the event 228. Examples of this are the display of FIG. 8 or FIG. 9 on a device 104.

Referring to FIG. 5F, in some embodiments, each respective record in the subject data store 214 further includes a class label, in a plurality of class labels, associated with the corresponding subject (548). Examples of class labels, include, but are not limited, to subject role in a business entity, health status, age, student, teacher, medical professional on duty, patient etc. A first event instruction set 232 in the event instruction set data store 226 corresponds to a first event 228 and includes (i) a first communication that is to be sent to a first subset of subjects in the plurality of subjects on the basis that they are associated with a first class label in the plurality of class labels and (ii) a second communication that is to be sent to a second subset of subjects in the plurality of subjects on the basis that they are associated with a second (different) class label in the plurality of class labels. The response computer system 200, in response to receiving an indication that the first event 228 has occurred, obtains an identity of the first and second subset of subjects (e.g., from the visual position map and/or the subject data store) and obtains, for each respective subject 216 in the first subset of subjects, the subject electronic address 220 associated with the respective subject 216 from the subject data store 214. The first communication is communicated to the subject electronic address 220 of each subject 216 in the first subset of subjects. There is obtained, for each respective subject 216 in the second subset of subjects, the subject electronic address 220 associated with the respective subject 216 from the subject data store 214. The second communication is communicated to the subject electronic address 220 of each subject 216 in the second subset of subjects. In some embodiments, the first class label is associated with event responders and the second class label is associated with event rescuees (550). This embodiment illustrates the versatility of the disclosed systems and methods in effectively handling complex events that require highly customized messages. Advantageously, rather than trying to segment the subjects by zone or position in order to transmit customized messages to them, the subjects in a closed environment can be segmented by their subject class. In some embodiments, customs messages are sent responsive to a given event based on a function of both (i) position within the closed environment (or outside the closed environment) and (ii) subject class.

Referring to FIG. 5G, in some embodiments (552), a first event instruction set 232 in the event instruction set data store 226 corresponds to a first event 228 and includes a first communication that is to be sent to a first subject 216 in the plurality of subjects on the basis that (i) the first subject 216 is associated with a first class label in the plurality of class labels (e.g., the first subject is a teacher) and (ii) an event 228 has occurred. In response to receiving an indication that the first event 228 has occurred, an identity of the first subject 216 is obtained from the visual position map on the basis that the first subject 216 has the first class label. For the first subject 216, the subject electronic address 220 associated with the respective subject 216 is obtained from the subject data store 214. In some embodiments (554), the first communication is communicated to the subject electronic address 220 of the first subject 216. In some embodiments, the first event 228 constitutes exceeding zone capacity in a first zone 238 in the closed environment and the first communication is a warning to the subject regarding the zone capacity in the first zone 238. Here, an example class label is a label indicating that the subject is responsible for the zone under question.

It will be appreciated that each subject can have multiple class labels. Furthermore Boolean logic can be used to form complex search expressions in order to achieve a highly select group of subjects that are to receive a custom message. For instance, a search expression can be made that asks for all subjects that are in zone 1 or 2 of the closed environment, that have taken CPR classes in the past three months, and that are not allergic to coal dust. All subjects that fit these criteria are then sent an individualized message through the response computer system.

In some embodiments (556), a first event instruction set 232 in the event instruction set data store 226 corresponds to a first event 228 associated with a first location in the closed environment and includes a first communication. In response to receiving an indication that the first event 228 has occurred, the first event 228 is communicated to the system administrator. In some embodiments (558), the first event 228 constitutes exceeding zone capacity in a first zone 238 in the closed environment and the first communication is a warning regarding exceeding zone capacity in the first zone 238.

Figure 11:
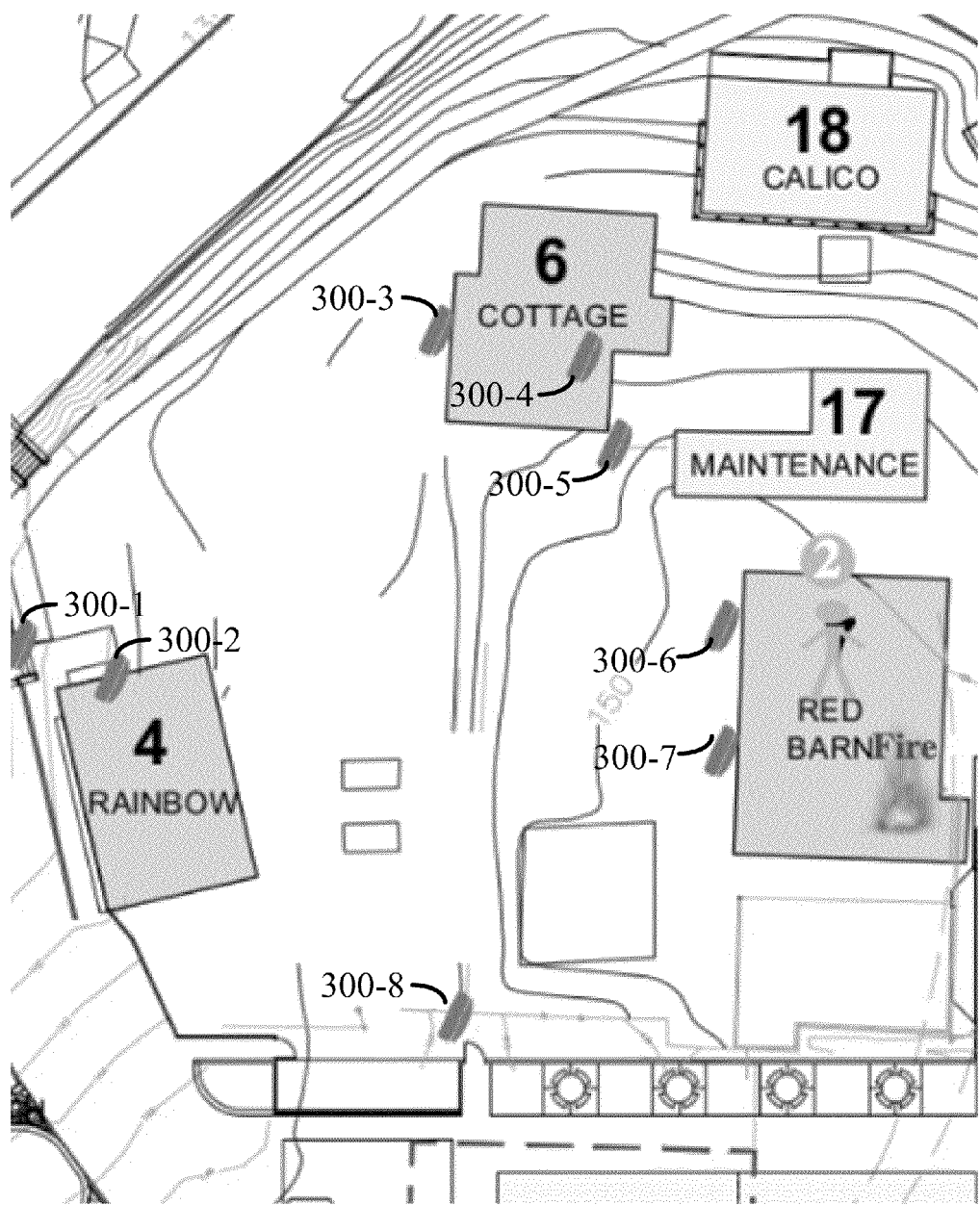
FIG. 11 illustrates a visual position map including a schematic diagram of a closed environment, with a respective icon at the position on the schematic diagram of each RFID reader in a plurality of RFID readers, and further indicates a location of an alert on the schematic diagram and a location of a subject that has been detected by an RFID reader, in accordance with an embodiment of the present disclosure.

In some embodiments (560), the visual position map is displayed with icons at the positions on the schematic diagram 236 of the closed environment of each subject 216 bearing a passive RFID tag detected by an RFID reader 300. The map optionally further displays, on the schematic diagram 236, some or all of the RFID readers, and optionally further displays a location of a first event 228 on the schematic diagram 236 when the first event 228 transpires. FIG. 11 illustrates such a visual position map. Furthermore, selection instructions that specify a message for all subjects in a subset of the closed environment are received. The subset of the environment is identified by a user by selecting a corresponding portion of the displayed visual position map. Advantageously, this can be done using a lasso maneuver with a mouse and/or by a lasso maneuver with a finger or stylus on a device 104 that has a touch screen. As such, the collection of subjects present in the subset of the closed environment is identified using the visual position map. The subject electronic addresses associated with these subjects are obtained from the subject data store 214 and the message is communicated to each such subject 216 via the electronic addresses.

Referring to FIG. 5H, in some embodiments (562), the visual position map is displayed with a respective icon at the position on the schematic diagram 236 of the closed environment of each subject 216 bearing a passive RFID tag detected by at least one of the plurality of RFID readers. The visual position map optionally further displays on the schematic diagram 236 at least a subset of the RFID readers in a plurality of the RFID readers and optionally further displays a location of a first event 228 on the schematic diagram 236 when the first event 228 transpires. Such a map is illustrated in FIG. 11. Selection instructions are received that specify (i) a subset of the closed environment and (ii) a message for all subjects in the subset of the closed environment. The subset of the closed environment is identified by a user by selecting a corresponding portion of the displayed visual position map. For instance using a touch screen of a device 104 and/or using a mouse. A responder or caretaker associated with the subset of the closed environment is identified and the message is communicated to the responder or caretaker. In some such embodiments (564), the first event 228 constitutes exceeding zone capacity in a first zone 238 in the closed environment and the first communication is a warning to the first subject 216 regarding the zone capacity in the first zone.

In some embodiments (566), a first RFID reader 300 in the plurality of RFID readers further comprises a second sensor, other than an RFID sensor and the instructions further cause the response computer system to, responsive to receiving an indication of an event 228 in a portion of the closed environment associated with the first RFID, remotely using the second sensor to verify an occurrence of the event 228. In some such embodiments (568), the second sensor is a camera, a temperature sensor, a noise-level detector a gas monitor, or a proximity sensor. Advantageously, such second level orthogonal verification serves to alleviate false alarms. For instance, if an event is reported, such as a fire in internal zone 1, a camera and/or smoke detector, associated with the RFID reader 300 of internal zone 1 can be used to independently verify whether there is a fire. Advantageously, such second level orthogonal verification also serves to provide event responders additional information. For instance, if an event is reported, such as a gunman in internal zone 1, a camera and/or microphone, associated with the RFID reader 300 of internal zone 1 can be used to independently collect information on what is occurring in internal zone 1 and communicate this information to devices 104 using the response computer system 200.

In some embodiments, the second sensor is a proximity sensor that is used to detect a subject going by the RFID sensor 300. In the event that the subject is not bearing an RFID tag, this interaction event will be communicated to the response computer system. This is useful in situations such as a vehicle passing through the main entry of a closed environment that is detected as having passed through, but no valid RFID tag is read. In this case the interaction event (the event of the subject being within reading distance of an RFID reader 300 without bearing a suitable RFID tag) can be reported to the response computer system 200 along with a license plate. In other examples, human subjects who pass through an entry/exit point but are not in possession of a valid RFID tag are reported to the response computer system 200 because of the addition of the proximity sensor. In some embodiments, the RFID sensor 300 includes the RFID sensor, a proximity sensor and a video camera, where the video camera is used to discern false alarms detected by the proximity sensor.

Figure 12:
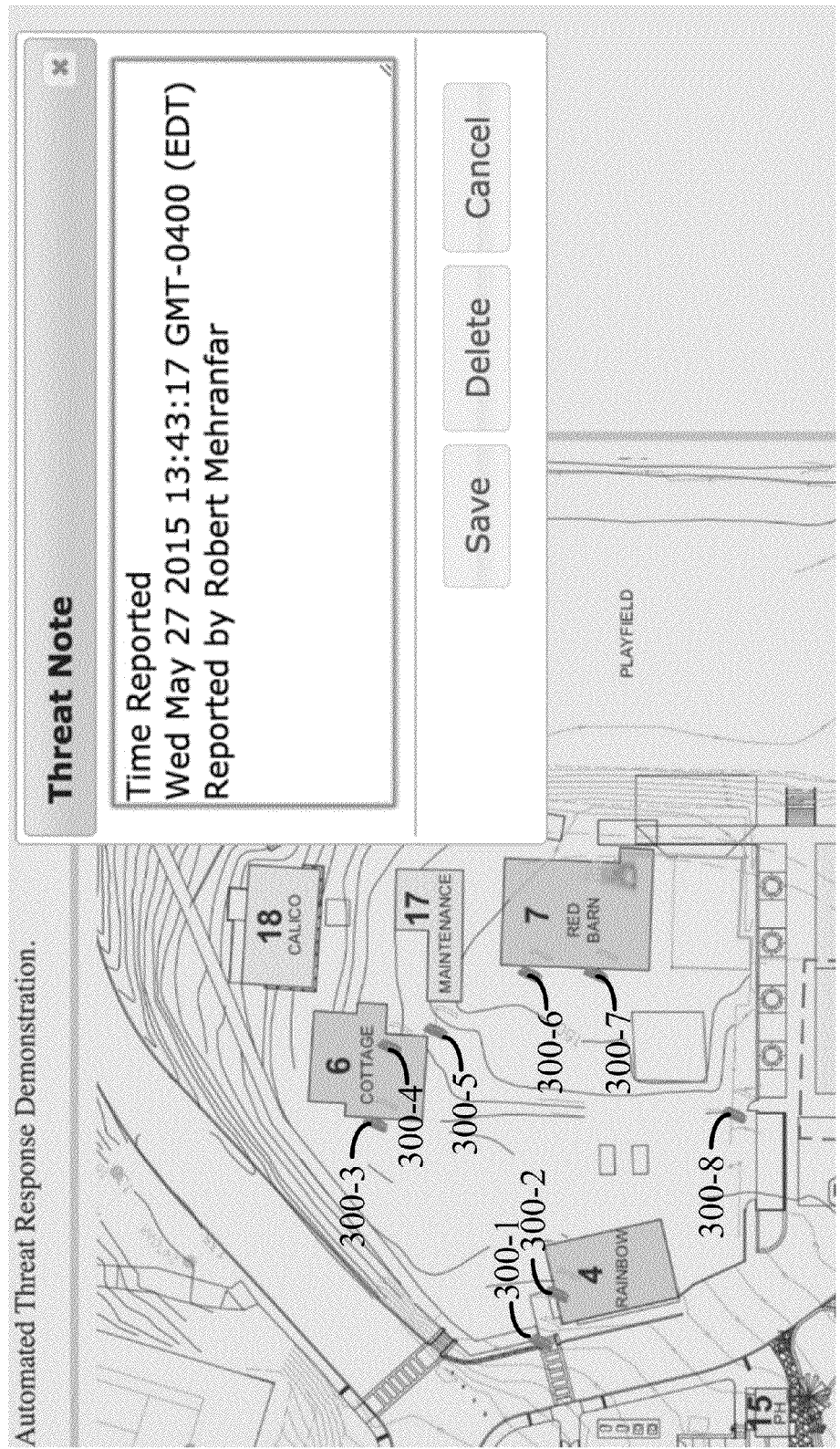
FIG. 12 illustrates a visual position map including a schematic diagram of a closed environment, with a respective icon at the position on the schematic diagram of each RFID reader in a plurality of RFID readers, and further indicates a location of an alert on the schematic diagram, and further indicates a report on the alert (threat note for fire), in accordance with an embodiment of the present disclosure.

FIG. 12 illustrates a visual position map including a schematic diagram of a closed environment, with a respective icon at the position on the schematic diagram of each RFID reader 300 in a plurality of RFID readers, and further indicates a location of an alert on the schematic diagram, and further indicates a report on the alert (threat note for fire), in accordance with an embodiment of the present disclosure. In some embodiments, the panel depicted in FIG. 12 is communicated to the electronic addresses of event responders for display on devices 104.

Figure 13:
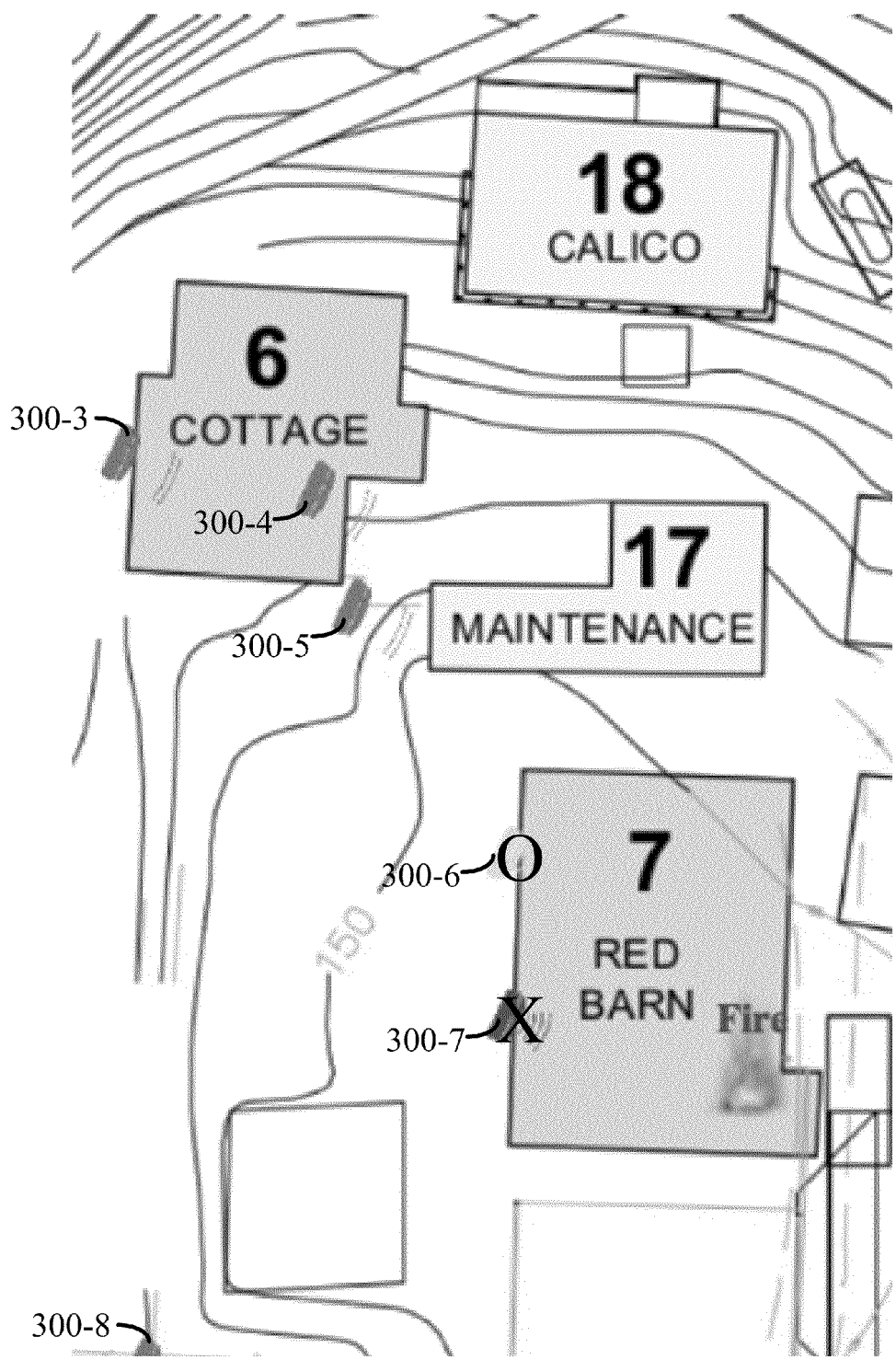
FIG. 13 illustrates a visual position map including a schematic diagram of a closed environment, with a respective icon at the position on the schematic diagram of each RFID reader in a plurality of RFID readers, and further indicates a location of an alert on the schematic diagram, and further indicates a status of each RFID reader in the plurality of RFID readers, in accordance with an embodiment of the present disclosure.

FIG. 13 illustrates a visual position map including a schematic diagram of a closed environment, with a respective icon at the position on the schematic diagram of each RFID reader 300 in a plurality of RFID readers, and further indicates a location of an alert on the schematic diagram, and further indicates a status of each RFID reader in the plurality of RFID readers, in accordance with an embodiment of the present disclosure. Here, RFID reader 300-6 is overlayed with an "O" meaning that it is on battery power due to a loss in grid power whereas RFID reader 300-7 is overlayed with an "X" meaning that it is inoperative. In some embodiments, the panel depicted in FIG. 13 is communicated to the electronic addresses of event responders for display on devices 104. It will be appreciated that the presence of RFID readers 300 that are inoperative in a closed environment will lead to inaccuracy in tracking the positions of subjects in the closed environment. In some embodiments, this is taken into account in the logic of the event instruction sets 232 and the messages such instructions sets 232 send to devices 102 and/or 104 are adjusted accordingly.

Figure 14:
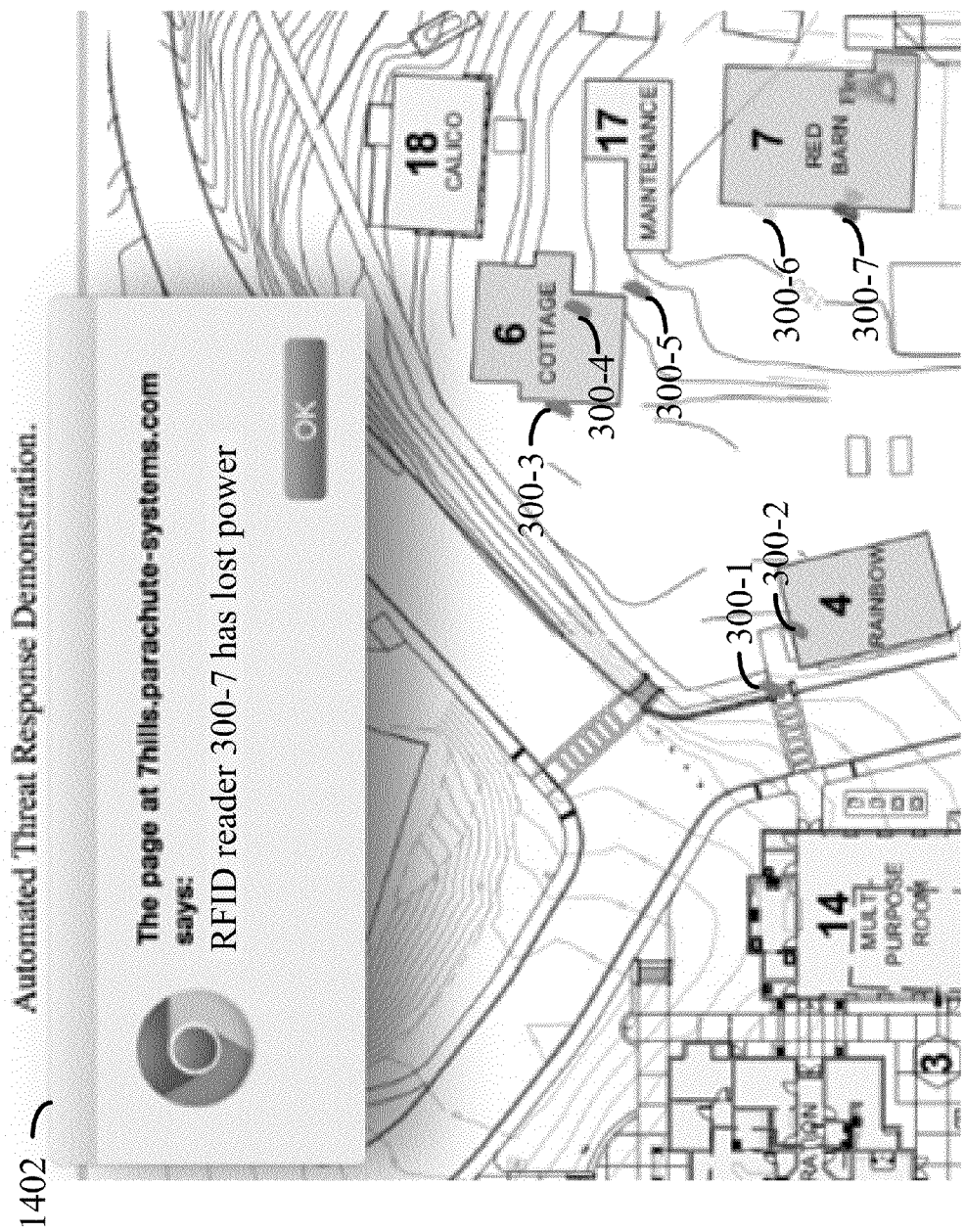
FIG. 14 illustrates the visual position map of FIG. 13 when an RFID reader icon has been selected, in accordance with an embodiment of the present disclosure.

FIG. 14 illustrates the visual position map of FIG. 13 when an RFID reader icon has been selected, in accordance with an embodiment of the present disclosure. For instance, in some embodiments, by clicking on the icon of an RFID reader displayed on the map will provide a panel 1402 that indicates the status of the selected RFID reader.

References Cited and Alternative Embodiments

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a nontransitory computer readable storage medium. For instance, the computer program product could contain the program modules shown in any combination of FIGS. 1, 2, 3, 4A and/or 4B. These program modules can be stored on a CD-ROM, DVD, magnetic disk storage product, or any other tangible computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A radio frequency identification (RFID) network for monitoring events in a closed environment, the network comprising a plurality of RFID readers distributed across the environment and a response computer system, wherein
each respective RFID reader in the plurality of RFID readers includes a unique reader identifier and is in communication with the response computer system; and
the response computer system comprises:
a memory;
one or more processors;
a sensor data store, stored in the memory or addressable by the response computer system, the sensor data store including, for each respective RFID reader in the plurality of RFID readers, a location in the closed environment of the respective RFID reader and the unique reader identifier of the respective RFID reader; and
instructions, stored in the memory and configured for execution by the one or more processors, that, when executed by the one or more processors, cause the response computer system to:
receive indication data, the indication data encompassing the detection of the proximity of a respective subject in a plurality of subjects bearing a passive RFID tag to a respective RFID reader in the plurality of readers, including (i) a unique subject identifier read off a passive RFID tag in the possession of the respective subject by the respective RFID reader and (ii) the reader identifier of the respective RFID reader;
maintain a subject data store, the subject data store comprising a record for each respective subject in the plurality of subjects that includes (i) a location of the respective subject in the closed environment or an indication that the respective subject is not in the closed environment, (ii) an electronic address associated with the respective subject, and (iii) a unique subject identifier associated with the respective subject, and (iv) a class label in a plurality of class labels; and
maintain an event instruction set data store, each respective event instruction set in the event instruction set data store corresponding to an event in a plurality of events, wherein
a first event instruction set in the instruction event set data store corresponds to a first event and includes a first message that is sent to a first subset of subjects in the plurality of subjects responsive to the first event, wherein the first subset of subjects are selected from the plurality of subjects on the basis that they are (a) localized to a first portion of the closed environment or (b) associated with a first class label in the plurality of class labels corresponding to the first message, and
the instructions further cause the response computer system to, in response to receiving an indication that the first event has occurred, execute a method comprising:
obtaining an identity of each respective subject in the first subset of subjects in accordance with the first event instruction set;
obtaining, for each respective subject in the first subset of subjects, the electronic address associated with the respective subject from the subject data store;
communicating the first message to the respective electronic address of each subject in the first subset of subjects; and
dispatching one or more aerial drones to execute a surveillance protocol, a containment protocol, or a rescue protocol within the closed environment.

2. The RFID network of claim 1, wherein the first event instruction set further includes:
a second message that is to be sent to a second subset of subjects in the plurality of subjects responsive to the first event, wherein the second subset of subjects are selected on the basis that they are (a) localized to a second portion of the closed environment different from the first portion of the closed environment, or (b) associated with a second class label in the plurality of class labels corresponding to the second message; and
the method responsive to receiving the indication that the first event has occurred further comprises:
obtaining an identity of each respective subject in the second subset of subjects in accordance with the first event instruction set;
obtaining, for each respective subject in the second subset of subjects, the electronic address associated with the respective subject from the subject data store; and
communicating the second message to the respective electronic address of each subject in the second subset of subjects.

3. The RFID network of claim 1, wherein a first drone in the one or more drones includes a video camera in electronic communication with the response computer system and wherein the first drone performs the surveillance protocol, wherein the surveillance protocol comprises:
instructing the drone to fly to a portion in the closed environment associated with the first event; and
obtaining, through the drone, video surveillance data from the portion of the closed environment.

4. The RFID network of claim 1, wherein the one or more aerial drones are stored at one or more storage locations in the closed environment or proximate to the closed environment.

5. The RFID network of claim 4, wherein a first storage location in the one or more storage locations is a first charging pad that a first aerial drone in the one or more aerial drones lands on autonomously without human intervention and is recharged by the first charging pad autonomously without human intervention.

6. The RFID network of claim 5, wherein
the first aerial drone comprises a rechargeable battery in electrical communication with at least two counter contacts at the bottom of the drone; and
the first charging pad comprises a plurality of area-wise distributed charging contacts which are insulated against each other or against neighboring primary contacts and are connectable with the at least two counter contacts when the first aerial drone lands on the first charging pad.

7. The RFID network of claim 6, wherein the plurality of area-wise distributed charging contacts is connected with a control unit and one or more electrical switches for wiring into a right polarity for recharging the rechargeable battery.

8. The RFID network of claim 6, wherein each charging contact in the plurality of area-wise distributed charging contacts is in the form of a rectangle, triangle, square or hexagonal shape.

9. The RFID network of claim 5, wherein the first charging pad is housed in a hanger that has a retractable entryway.

10. The RFID network of claim 1, wherein a first drone in the one or more drones includes a loudspeaker and a microphone in electronic communication with the response computer system, the first drone is instructed to perform the surveillance protocol, and the surveillance protocol comprises:

instructing the first drone to fly to a portion in the closed environment associated with the first event;

communicating, through the loudspeaker, instructions to subjects in the plurality of subjects in accordance with the first event instruction set; and obtaining, through the microphone, audio surveillance data from the portion of the closed environment.

11. The RFID network of claim 1, wherein a first drone in the one or more drones includes an RFID reader in electronic communication with the response computer system and wherein the first drone is instructed to perform the surveillance protocol, wherein the surveillance protocol comprises:

instructing the first drone to fly to a portion in the closed environment associated with the first event; and obtaining, through the RFID reader, confirmation of an identity of each subject in the portion of the closed environment.

12. The RFID network of claim 1, wherein a first drone in the one or more drones includes a video camera and a debilitating device in electronic communication with the response computer system, the first drone is instructed to perform the containment protocol, and the containment protocol comprises:

instructing the first drone to fly to a portion in the closed environment associated with the first event;

obtaining, through the video camera, confirmation of a nefarious subject activity occurring in the portion of the closed environment;

receiving authorization, at the first drone from the response computer system, to use the debilitating device upon confirmation of the nefarious subject activity; and using the debilitating device to counter the nefarious subject activity.

13. The RFID network of claim 12, wherein the debilitating device is a stun gun and using the debilitating device to counter the nefarious subject activity comprises stunning a subject responsible for the nefarious subject activity with an electric shock.

14. The RFID network of claim 12, wherein the debilitating device is a smoke bomb and using the debilitating device to counter the nefarious subject activity comprises activating the smoke bomb.

15. The RFID network of claim 1, wherein a first drone in the one or more drones includes a sensor in electronic communication with the response computer system, the first drone is instructed to perform the surveillance protocol, and the surveillance protocol comprises:

instructing the first drone to fly to a portion in the closed environment associated with the first event; and obtaining, through the first drone, sensor data from the portion of the closed environment using the sensor.

16. The RFID network of claim 15, wherein the sensor is temperature sensor, a noise-level detector, a gas monitor, an air flow meter, a humidity sensor, a pressure sensor, a chemical sensor, or a radiation sensor.

17. The RFID network of claim 16, wherein the surveillance protocol further comprises:

using the sensor to map out one or more safe passage routes from the portion in the closed environment; and sending the one or more safe passage routes to the response computer system for dissemination to the first subset of subjects.

18. The RFID network of claim 1, wherein a first drone in the one or more drones includes an 802.11 router in electronic communication with the response computer system, the first drone is instructed to perform the surveillance protocol, and the surveillance protocol comprises:

instructing the first drone to fly to a portion in the closed environment associated with the first event; and providing, through the first drone, 802.11 communication services to facilitate communication between subjects at the portion of the closed environment and the response computer system.

19. The RFID network of claim 1, wherein the instructions further cause the response computer system to maintain a visual position map based on the indication data, the visual position map comprising:

a respective position, on a schematic diagram of the closed environment, of each subject bearing a passive RFID tag detected by at least one RFID reader in the plurality of RFID readers and the one or more aerial drones; and a respective position, on the schematic diagram of the closed environment, of the one or more aerial drones.

20. The RFID network of claim 1, wherein a first drone in the one or more drones includes a video camera in electronic communication with the response computer system, the first drone is instructed to perform the containment protocol, and the containment protocol comprises:

instructing the first drone to fly to a portion in the closed environment associated with the first event;

obtaining, through the video camera, confirmation of a nefarious subject in the portion of the closed environment;

receiving authorization, at the first drone from the response computer system, for the drone to crash into the nefarious subject.

21. The RFID network of claim 1, wherein a first aerial drone in the one or more aerial drones is dispatched to perform the rescue protocol, and wherein the rescue protocol comprises using the first aerial drone to guide the rescue personnel to a site of the first event.

22. The RFID network of claim 1, wherein the closed environment comprises a plurality of internal zones, and each respective RFID reader in a second subset of the plurality of RFID readers is positioned at an entry of an internal zone in the plurality of internal zones.

23. The RFID network of claim 1, wherein a first aerial drone in the one or more aerial drones is dispatched to perform the rescue protocol, and wherein the rescue protocol comprises:

dispatching the first aerial drone to an entrance of the closed environment; and upon arrival at the entrance of one or first responders, guiding the one or more first responders to a location of the first event.

24. The RFID network of claim 1, wherein the closed environment is a warehouse, a manufacturing facility, a refinery, a school, a business campus, a cruise ship, a subject transportation hub, a government facility, a military installation, a conference center, a medical campus facility, a correctional facility, hotel, or a mine.

25. The RFID network of claim 1, wherein the closed environment includes one or more buildings and one or more predefined open areas.

26. The RFID network of claim 1, wherein a first aerial drone in the one or more aerial drones is dispatched to perform the rescue protocol, and wherein the rescue protocol comprises:

dispatching the first aerial drone to a position in an exit route from the closed environment; and upon arrival at the position of one or subjects in the plurality of subjects at the position, using the first aerial drone to guide the one or more subjects along the exit route.

27. The RFID network of claim 1, wherein a first RFID reader in the plurality of RFID readers further comprises a second sensor, other than an RFID sensor, and wherein the instructions further cause the response computer system to:

responsive to receiving an indication of an event in a portion of the closed environment associated with the first RFID, remotely using the second sensor to verify an occurrence of the event.

28. The RFID network of claim 1, wherein a first RFID reader in the plurality of RFID readers further comprises a second sensor, other than an RFID sensor, and wherein the instructions further cause the response computer system to use the second sensor to independently obtain a measurement, wherein the second sensor is a camera, a temperature sensor, a noise-level detector, a gas monitor, a proximity sensor, a chemical sensor, or a radiation sensor.

29. The RFID network of claim 1, wherein the electronic address is a mobile phone number, social media account, or e-mail address associated with the respective subject.

30. The RFID network of claim 1, wherein the instructions further cause the response computer system to execute an RFID reader status module method comprising:

receiving, on a recurring basis, a respective status signal from each respective RFID reader in the plurality of RFID readers, wherein the respective status signal indicates a status of the respective RFID reader, and analyzing each respective status signal for the status of the corresponding RFID reader.

\* \* \* \* \*